(12) United States Patent  (10) Patent No.: US 8,514,227 B2
Matsuda  (45) Date of Patent: Aug. 20, 2013

(54) ELECTRONIC COMPUTER AND METHOD OF CONTROLLING THE SAME

(75) Inventor: Kouji Matsuda, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 784 days.

(21) Appl. No.: 12/720,097

(22) Filed: Mar. 9, 2010

(65) Prior Publication Data

US 2010/0231596 A1  Sep. 16, 2010

(30) Foreign Application Priority Data

Mar. 12, 2009  (JP) ................. 2009-059670

(51) Int. Cl.
  *G06T 11/20* (2006.01)
  *G06G 7/18* (2006.01)
(52) U.S. Cl.
  USPC ......................................... 345/440; 708/823
(58) Field of Classification Search
  USPC ............................................................ 708/823
  See application file for complete search history.

(56) References Cited

U.S. PATENT DOCUMENTS

| 4,794,553 A | * | 12/1988 | Watanabe et al. | ............. 708/160 |
| 4,794,554 A | * | 12/1988 | Tamiya | ........................ 708/160 |
| 5,210,708 A | * | 5/1993 | Negishi | ......................... 708/174 |
| 5,365,473 A | * | 11/1994 | Namiki et al. | ................. 708/823 |
| 7,289,120 B2 | * | 10/2007 | Fukaya | .......................... 345/440 |
| 2002/0075227 A1 | | 6/2002 | Miller et al. | |
| 2008/0136821 A1 | | 6/2008 | Okano et al. | |

FOREIGN PATENT DOCUMENTS

| JP | 63-103353 A | 5/1988 |
| JP | 9-134331 A | 5/1997 |
| JP | 2001-216273 A | 8/2001 |
| JP | 2002-351848 A | 12/2002 |
| JP | 2003-296285 A | 10/2003 |

OTHER PUBLICATIONS

Australian Office Action dated May 9, 2011 (in English) in counterpart Australian Application No. 2010200876.
Japanese Office Action dated Mar. 8, 2011 (and English translation thereof) in counterpart Japanese Application No. 2009-059670.

* cited by examiner

*Primary Examiner* — Ryan R Yang
(74) *Attorney, Agent, or Firm* — Holtz, Holtz, Goodman & Chick, P.C.

(57) ABSTRACT

A display that displays a graph corresponding to a function expression, an input unit that specifies a plurality of point positions on the graph displayed on the display unit, a processor that performs display control of a graph corresponding to a function expression on the display unit, does a specific calculation on the basis of positional information on a plurality of pointers displayed on the display unit and the function expression of the graph and performs display control of a result of calculation on the display unit, performs movement display control on the graph of an arbitrary one of the plurality of pointers displayed on the display unit according to an input from the input unit, and does the calculation again, updates the result of calculation, and performs display control of the updated result on the display unit, an storage area, and a work storage area, are provided.

18 Claims, 13 Drawing Sheets

ELECTRONIC COMPUTER AND METHOD OF CONTROLLING THE SAME

CROSS-REFERENCE TO RELATED APPLICATIONS

This application is based upon and claims the benefit of priority from prior Japanese Patent Application No. 2009-059670, filed Mar. 12, 2009, the entire contents of which are incorporated herein by reference.

BACKGROUND OF THE INVENTION

1. Field of the Invention

The present invention relates to an electronic computer suitable for a graphical function calculator or the like and a method of controlling the same.

2. Description of the Related Art

Some of the known electronic computers, including scientific electronic calculators, are so-called graphical function calculators which display a graph corresponding to a function expression input by the user. When the user inputs a function expression by operating the input keys and then gives an instruction to draw a graph by operating a specific key, the graphical function calculator draws and displays a graph of the function on the orthogonal coordinate axes.

Some graphical function calculators have a trace function. The trace function is to move a pointer on the function graph according to the key operation and display the coordinate values of the position of the pointer on the graph at the time.

Concerning the graphical function calculator with a trace function, the technique for enabling two trace pointers to be displayed at the same time has been considered (e.g., Jpn. Pat. Appln. KOKAI Publication No. 2001-216273).

Conventional graphical function calculators are incapable of analyzing the relationship between two points on a graph. The same holds true for the technique disclosed in the above patent document. That is, the relationship between two points on a graph was incapable of being analyzed variously.

BRIEF SUMMARY OF THE INVENTION

It is an object of the invention to provide an electronic computer capable of improving the function graph analysis capability by making various analyses of the relationship between two points on a graph and of helping the user gain a better understanding of a basic structure of the graph and a method of controlling the electronic computer.

According to one aspect of the present invention, there is provided an electronic computer comprising: a display unit; a graph display control unit that performs display control of a graph corresponding to a function expression on the display unit; a position specify unit that specifies a plurality of point positions on the graph displayed on the display unit according to a user operation; a pointer display control unit that performs display control of a pointer for each of the plurality of point positions on the display unit specified by the position specify unit; a calculation result display control unit that does a specific calculation on the basis of positional information on a plurality of pointers displayed on the display unit and the function expression of the graph and performs display control of a result of calculation on the display unit; and a pointer movement control unit that performs movement display control on the graph of an arbitrary one of the plurality of pointers displayed on the display unit according to a user operation, wherein the calculation result display control unit does the calculation again, updates the result of calculation, and performs display control of the updated result on the display unit each time the pointer movement control unit performs movement display control of a pointer.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, embodiments of the invention will be explained in detail.

Figure 1:
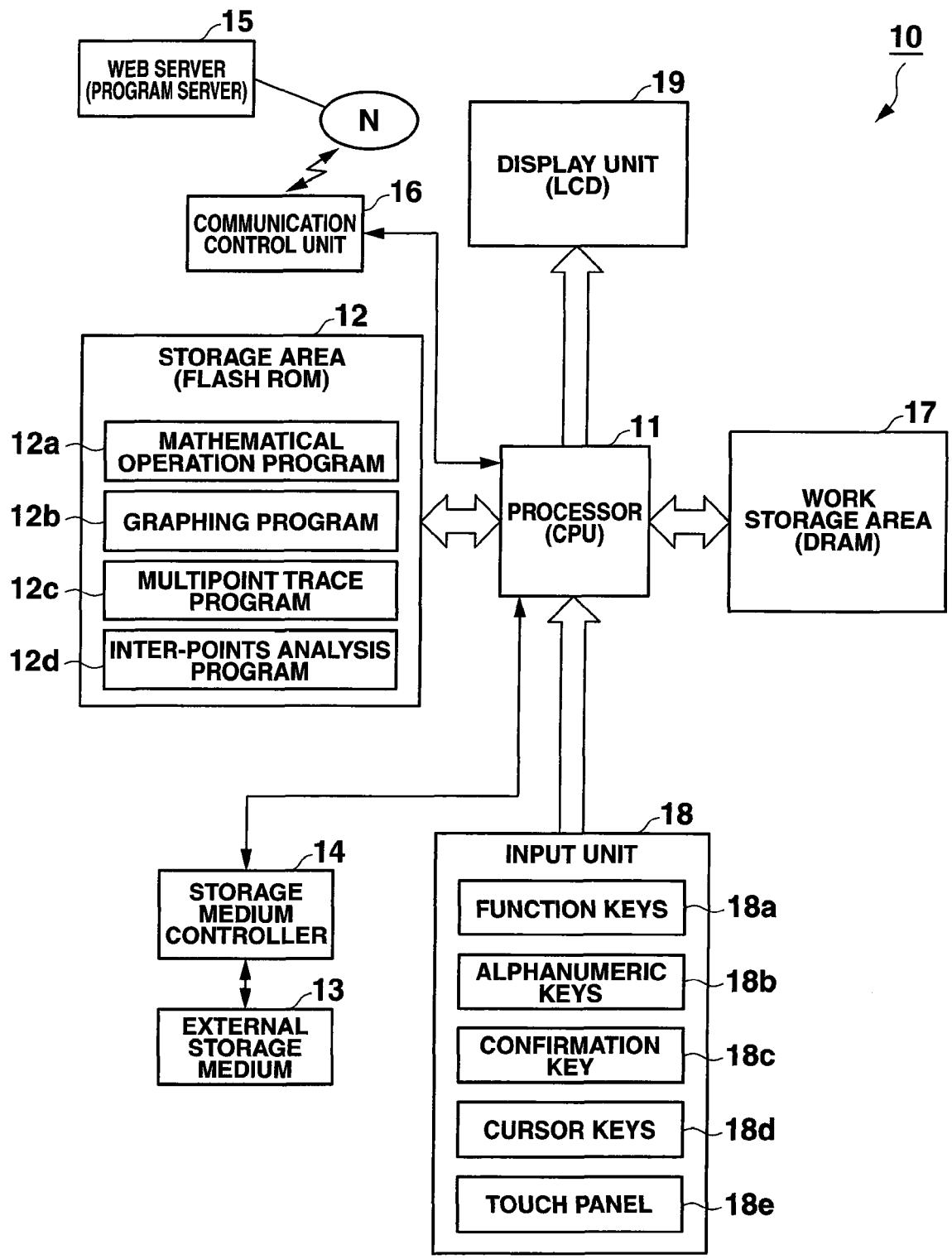
FIG. 1 is a block diagram showing the configuration of a functional circuit of a graphical function calculator, an electronic computer according to an embodiment of the invention.

As shown in FIG. 1, a graphical function calculator 10 includes a processor 11.

The processor 11 controls the operation of each part of the circuitry of the graphical function calculator 10 by use of a work storage area 17 (e.g., random access memory [RAM]) according to a system program previously stored in a storage area 12 (e.g., a flash memory), a computer control program read into the storage area 12 from an external storage medium 13 (e.g., a memory card) via a storage medium controller 14, or a computer control program downloaded into the storage area 12 from a Web server (or a program server) 15 on a communication network N via a communication control unit 16.

The system program or computer control program previously stored in the storage area 12 is activated in response to a key input signal from an input unit 18.

Connected to the processor 11 are the storage area 12, the storage medium controller 14, the communication control unit 16, the work storage area 17, the input unit 18, and a display unit 19.

The storage area 12 stores a computer control program which supervises the entire operation of the graphical function calculator 10, a mathematical operation program 12a which performs arithmetic processing according to various function expressions arbitrarily input by the user, a graphing program 12b which causes the display unit 19 to display various function expressions used by the mathematical operation program 12a in the form of graphs, a multipoint trace program 12c which is for displaying a plurality of pointers that move while tracing a function expression graph displayed on the display unit 19, and a inter-points analysis program 12d which is for making analyses by various calculations in each of the intervals sectionalized by the plurality of pointers.

The input unit 18 is provided with function keys 18a which are operated to specify functions in various compute modes provided on the graphical function calculator 10, alphanumeric keys 18b which are operated to input various numbers, characters, and others used in function expressions, a confirmation key 18c which is operated to specify the confirmation of input data or the execution of mathematical operations, cursor keys 18d, "↑," "↓," "←," "→," which are operated to move and display cursor C or the input position of an item on the display screen or specify the movement of a pointer on the displayed graph, a touch panel 18e composed of a transparent electrode layer integrally formed on the display unit 19, and others.

As for a temporary effective function which is not set in the function keys 18a, a function name to specify the execution of the function or a symbol or the like corresponding to the function name may be displayed on the display unit 19 in the form of a rectangular button. The function can be executed by pressing the display position of the button on the touch panel 18e.

The display unit 19 is composed of, for example, a Liquid Crystal Display (LCD) that provides a dot-matrix display with a backlight. The display unit 19 displays an input function expression, a graph of the function expression with the orthogonal coordinate axes, and a plurality of pointers on the graph.

Next, the operation of the embodiment will be explained.

In the embodiment, explanation will be given about a case where any one of "the slope calculation mode," "the maximum/minimum value calculation mode," "the integration calculation mode," "the maximum/minimum differential value calculation mode," "the continuity/discontinuity determination mode," and "the local maximum/minimum value calculation mode" is selected for the function displayed in graphical form and calculations are done between a plurality of points.

Figure 2:
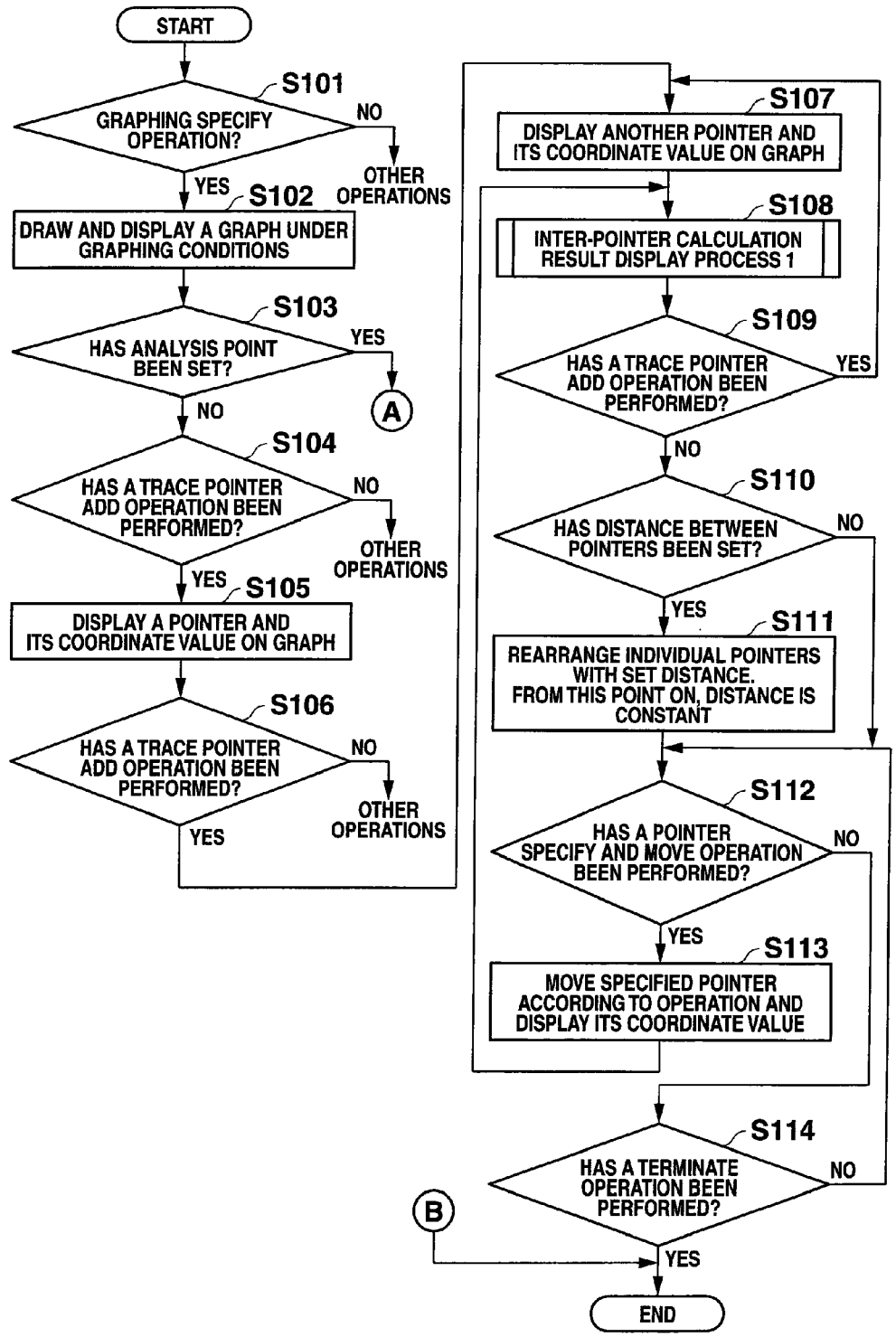
FIG. 2 is a flowchart to explain the process of displaying a graph of a function expression according to the embodiment.
Figure 3:
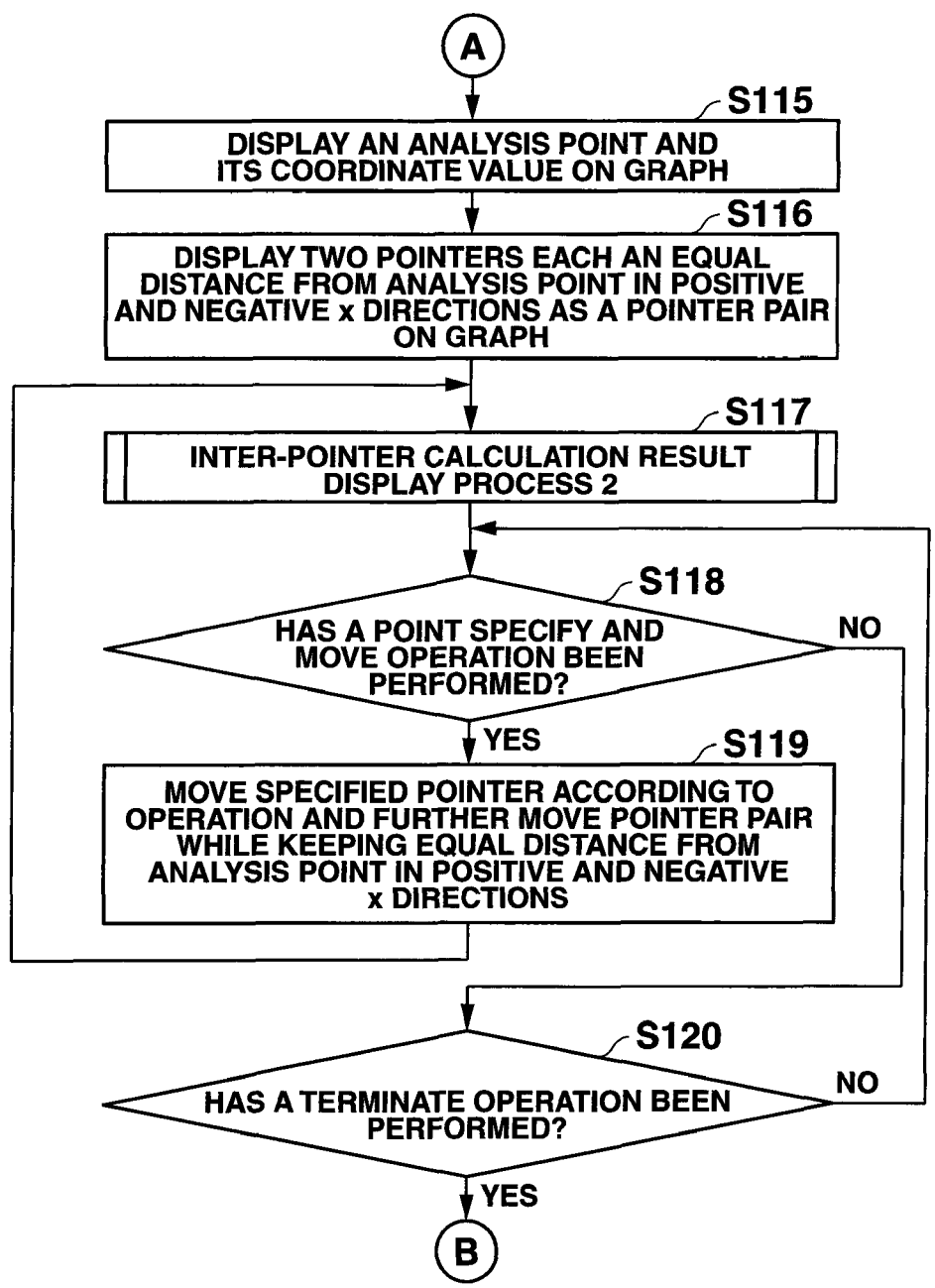
FIG. 3 is a flowchart to explain the process of displaying the graph of the function expression according to the embodiment.

FIGS. 2 and 3 are flowcharts to mainly explain the process of displaying a graph when a function expression is input. A detailed explanation of the processes not directly related to the embodiment will not be given, provided that other suitable processes are performed.

First, it is determined whether a key operation has been performed to specify graphing for the input function expression (step S101).

If a key operation to specify a process other than graphing has been performed, an explanation of it will be omitted, provided another suitable operation is performed.

If it has been determined in step S101 that a key operation to specify graphing has been performed, the graphing program 12b causes the display unit 19 to draw and display a graph under graphing conditions set at the time (step S102). The graphing conditions are such that, for example, an x-coordinate binary value representing a range of the graph on the x-axis and a y-coordinate binary value representing a range of the graph on the y-axis are input and set in advance.

After it has been determined that an analysis point for analyzing the vicinity of a specific point on the graph have not been set (step S103), it is determined whether an operation to add a first trace pointer which moves on the graph has been performed (step S104).

If an operation other than the operation of setting the addition of a trace pointer has been performed, an explanation of it will be omitted, provided another suitable operation is performed.

If it has been determined in step S104 that an operation to add the first trace pointer has been performed, the multipoint trace program 12c causes the display unit 19 to display not only the first trace pointer at a point on the graph, such as a position corresponding to the midpoint of the x-coordinate in the display range, but also the x-coordinate value and the y-coordinate value of the position (step S105).

Thereafter, it is further determined whether an operation to add a second trace pointer which moves over the graph has been performed (step S106).

If an operation other than the operation of setting the addition of a trace pointer has been performed, an explanation of it will be omitted, provided another suitable operation is performed.

On the other hand, if it has been determined in step S106 that an operation to add the second trace pointer has been performed, the multipoint trace program 12c displays not only the second trace pointer at a point on the graph on the display unit 19, for example, at a position shifted one graduation from the first trace pointer in the positive direction of the x-axis, but also the x- and y-coordinate values of the position (step S107).

Since the two trace pointers have been positioned on the graph on the display unit 19, a first process is performed (step S108). In the first process, the inter-points analysis program 12d carries out an operation between two points in the preset calculation mode and the result of the calculation is displayed together with the graph.

The details of the inter-pointer calculation result display process 1 will be described later.

In a state where the result of calculation is displayed, it is further determined whether operations to add a third and later trace pointers have been performed (step S109).

If it has been determined that operations to add a third and later trace pointers have been performed, control returns to step S107 and the multipoint trace program 12c causes the display unit 19 to display not only the trace pointer at one other point on the graph but also the x- and y-coordinate values of the one other point.

Then, the inter-points analysis program 12d performs a first process in response to the added trace pointer (step S108). In the first process, the inter-points analysis program 12d carries out an operation between the third and later pointers in the preset calculation mode and displays the result of calculation together with the graph.

In this way, each time one of the third and later trace pointers is added, the processes in steps S109, S107, and S108 are performed repeatedly and the result of the distance-between-pointers calculations on the basis of the added trace pointer are displayed sequentially.

If it has been determined in step S109 that an operation to add a trace pointer has not been performed any more, it is determined whether the distance between the trace pointers already input at the time is set (step S110).

Here, if it has been determined that the distance between the trace pointers is not set, it is determined whether a key operation to specify the movement of any one of the plurality of trace pointers has been performed (step S112).

If it has been determined that a key operation to specify the movement has not been performed, it is determined whether an operation to terminate the operation at the graphical function calculator 10 and shut down the power supply has been performed (step S114).

If it has been determined that an operation to shut down the power supply has not been performed, control returns to the process in step S112. In this way, the processes in steps S112 and S114 are performed repeatedly, thereby waiting for either a key operation to specify the movement of a trace pointer or a key operation to terminate the operation and shut down the power supply to be performed.

Then, if a key operation to terminate the operation and shut down the power supply has been performed, it is determined in step S114 that the key operation has been performed and the power supply is shut down as requested by the operation, which terminates the processes of FIGS. 2 and 3.

If it has been determined in step S112 that a key operation to specify the movement of a trace pointer has been performed, the multipoint trace program 12c moves the specified trace pointer on the graph according to the operation of the cursor keys ("←" and "→" keys) 18d on the input unit 18 and displays the x- and y-coordinate values after the movement of the pointer (step S113).

Thereafter, control is passed to the processes in step S108 and forward and a first process is carried out. In the first process, the inter-points analysis program 12d carries out a new operation between trace pointers on the basis of the trace pointer moved on the graph and displays the result of calculation together with the graph.

Next, the first process in step S108 in each calculation mode will be explained in detail.

Figure 4:
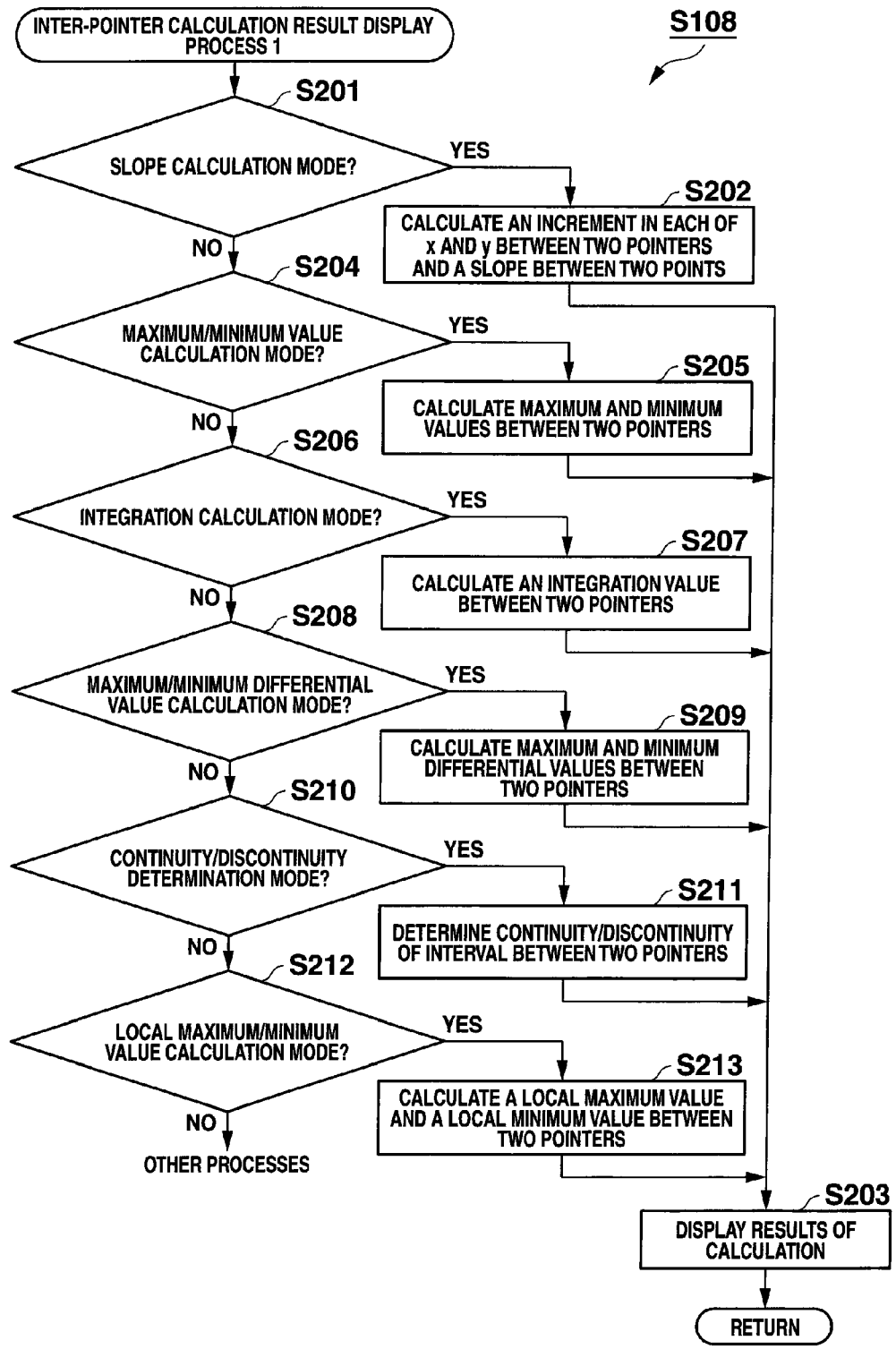
FIG. 4 is a flowchart to explain a subroutine of inter-pointer calculation result display process 1 of FIG. 2 according to the embodiment.

In FIG. 4, it is determined whether the calculation mode set at the time is the slope calculation mode in which a slope between points is calculated (step S201).

If it has been determined that the slope calculation mode has been set, an increment in each of the x- and y-coordinates between two adjacent trace pointers and a slope between the two points are calculated (step S202).

Then, the display unit 19 is caused to display the results of calculation together with the graph (step S203), which terminates the subroutine and returns control to the main routine of FIG. 2.

Figure 6:
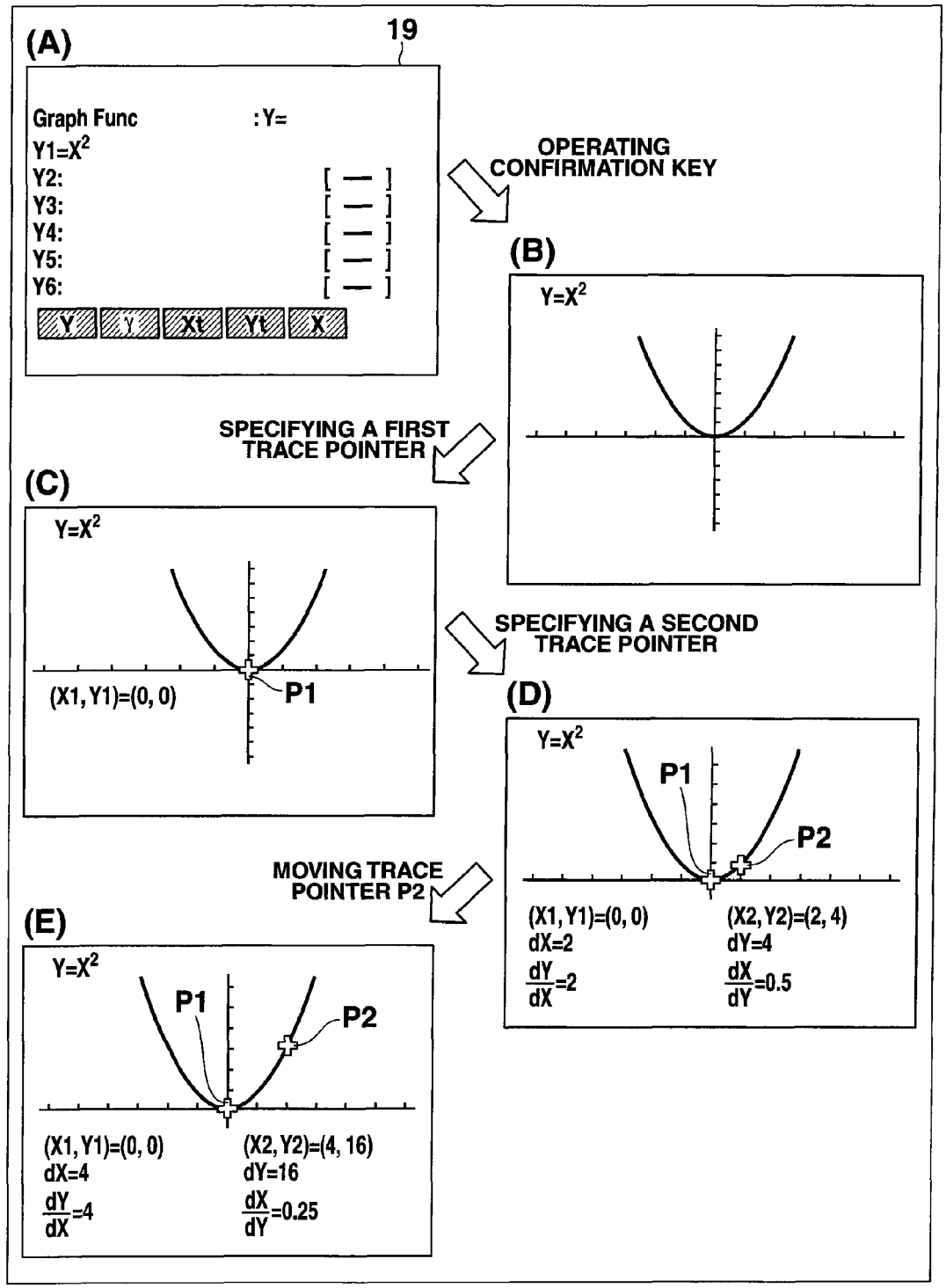
FIG. 6 illustrates a transition state of the display screen in a slope calculation mode according to the embodiment.

FIG. 6 shows an example of the transition of the screen on the display unit 19 when the slope calculation mode has been set. As shown in FIG. 6 (A), when the function expression "Y1=X2" is input and then the confirmation key 18c on the input unit 18 is operated, a graph corresponding to the function expression is displayed together with the function expression "Y=X2" on the display unit 19, as shown in FIG. 6 (B).

In the display state of FIG. 6 (B), when a trace pointer display operation is carried out, trace pointer P1 for the first point is displayed in the position of the origin, the intersection of the x- and y-axes. At this time, the coordinate values of trace pointer P1 are displayed as "(X1, Y1)=(0, 0)" together with the graph.

Here, when a trace pointer display operation is further carried out, trace pointer P2 for a second point is displayed in a position shifted a specific distance, for example, only 2, from trace pointer P1 in the positive direction of the x-axis, as shown in FIG. 6 (D). At this time, the coordinate values of trace pointer P2 are displayed as "(X2, Y2)=(2, 4)" together with the graph.

With that, since the smallest plurality of trace pointers (or two trace pointers) have been specified, an increment of dX=2 in the x-direction, an increment of dY=4 in the y-direction, a slope of dY/dX=2, and a slope of dX/dY=0.5 are determined by calculations in step S202 and the results of calculation are displayed together with the graph.

Here, as for the slope between two trace pointers, a slope of dY/dX with respect to an increment in the x-direction and a slope of dX/dY with respect to an increment in the y-direction are calculated. One of the two slopes is the reciprocal of the other unless both of the two slopes are not zero.

In the display state shown in FIG. 6 (D), with trace pointer P2 selected by, for example, the cursor keys 18d, the confirmation key 18c is operated to determine the selection of trace pointer P2 and then "←" key or "→" key in the cursor keys 18d is operated to move trace pointer P2 arbitrarily on the graph.

FIG. 6 (E) shows a state where trace pointer P2 is moved to the coordinate position (4, 14) by operating, for example, "→" key in the cursor keys 18d. In FIG. 6 (E), "(X2, Y2)=(4, 16)" is shown as the coordinate position. In addition, an increment of dX=4 in the x-coordinate, an increment of dY=16 in the y-coordinate, a slope of dY/dX=4, and a slope of dX/dY=0.25 are calculated and the results are displayed together with the graph.

As described above, each time an arbitrary trace pointer P is selected and moved, an increment in the x-coordinate, an increment in the y-coordinate, and a slope between trace pointers are updated and displayed.

In the state shown in FIG. 6 (E), trace pointers for the third and later points can be specified. For example, in a state where the third trace pointer (P3) is displayed in a position greater in the x-direction than the coordinate position of trace pointer P2, an increment in the x-coordinate, an increment in the y-coordinate, and a slope between trace pointer P1 and trace pointer P2, and an increment in the x-coordinate, an increment in the y-coordinate, and a slope between trace pointer P2 and trace pointer P3 are displayed as the results of calculation.

As described above, in the slope calculation mode, an increment in the x-coordinate and an increment in the y-coordinate between two trace pointers P1 and P2 and the slope between two points are calculated and the results of calculation are displayed together with the graph.

Accordingly, a slope liable to be visually misunderstood, depending on the setting of the display range, can be understood easily by displaying various numeric values together with the graph.

In addition, since the positions of two trace pointes can be easily changed and set by moving trace pointers, the way the slope is changed by the position setting of trace pointers can be understood easily.

In step S201 of FIG. 4, if it has been determined that the set calculation mode is not the slope calculation mode, it is determined whether the set calculation mode is the maximum/minimum value calculation mode in which the maximum and minimum values between points is found (step S204).

If it has been determined that the maximum/minimum value calculation mode has been set, the maximum and minimum values which Y between two adjacent trace pointers can take are calculated (step S205) and the results of calculation are displayed together with the graph on the display unit 19 (step S203), which completes the subroutine and returns control to the main routine of FIG. 2.

Figure 7:
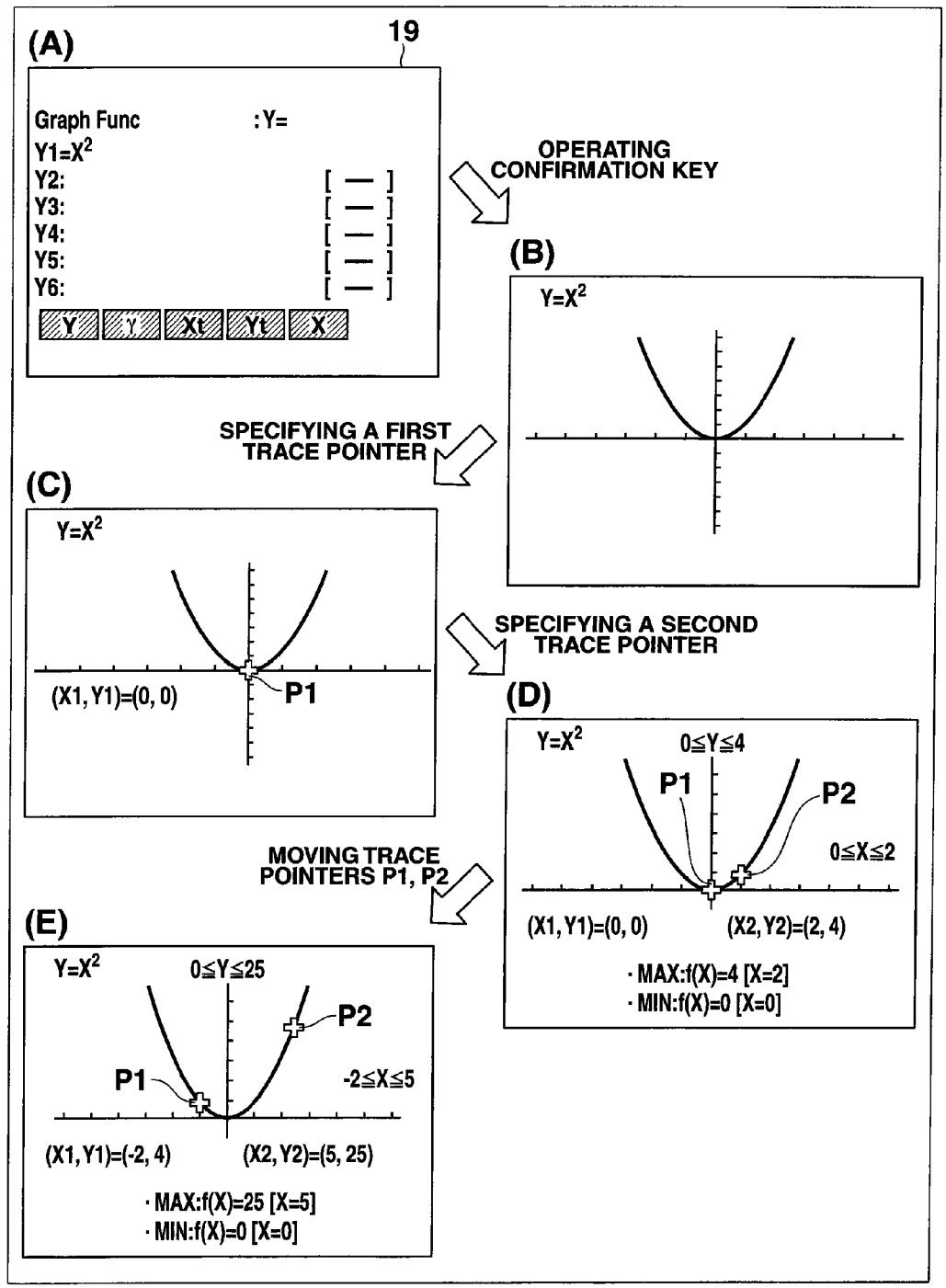
FIG. 7 illustrates a transition state of the display screen in a maximum/minimum value calculation mode according to the embodiment.

FIG. 7 shows an example of the transition of the screen on the display unit 19 when the maximum/minimum value calculation mode has been set. As shown in FIG. 7 (A), when the function expression "Y1=X2" is input and then the confirmation key 18*c* on the input unit 18 is operated, a graph corresponding to the function expression is displayed together with the function expression "Y=X2" on the display unit 19, as shown in FIG. 7 (B).

In the display state of FIG. 7 (B), when a trace pointer display operation is carried out, trace pointer P1 for the first point is displayed in the position of the origin, the intersection of the x- and y-axes. At this time, the coordinate values of trace pointer P1 are displayed as "(X1, Y1)=(0, 0)" together with the graph.

Here, when a trace pointer display operation is further carried out, trace pointer P2 for the second point is displayed in a position shifted a specific distance, for example, only 2, from trace pointer P1 in the positive direction of the x-axis, as shown in FIG. 7 (D). At this time, the coordinate values of trace pointer P2 are displayed as "(X2, Y2)=(2, 4)."

With that, since the smallest plurality of trace pointers (or two trace pointers) have been specified, the following are calculated and displayed together with the graph:

$f(X)=4[X=2]$    Maximum value MAX $f(x)=0[X=0]$    Minimum value MIN

At the same time, a y-coordinate range of "0≦Y≦4" between two trace pointers is displayed in the upper part of the y-axis and an x-coordinate range of "0≦X≦2" is displayed above the right end of the x-axis.

In the display state shown in FIG. 7 (D), with trace pointer P1 selected by, for example, the cursor keys 18*d*, the confirmation key 18*c* is operated to determine the selection of trace pointer P1 and then "←" key or "→" key in the cursor keys 18*d* is operated to move trace pointer P1 arbitrarily on the graph.

Similarly, with trace pointer SP2 selected by the cursor keys 18*d*, the confirmation key 18*c* is operated to determine the selection of trace pointer P2 and then "←" key or "→" key in the cursor keys 18*d* is operated to move trace pointer P2 arbitrarily on the graph.

FIG. 7 (E) shows a state where trace pointer P1 is moved to the coordinate position (−2, 4) by operating, for example, "→" key in the cursor keys 18*d* and trace pointer P2 is moved to the coordinate position (5, 25) by operating "→" key in the cursor keys 18*d*.

Here, the coordinate position is displayed as "(X1, Y1)=(−2, 4)" "(X2, Y2)=(5, 25)." At the same time, the following maximum and minimum values are calculated and displayed together with the graph:

$f(X)=25[X=5]$    Maximum value MAX $f(X)=0[X=0]$    Minimum value MIN

As described above, each time an arbitrary trace pointer P is selected and moved, the maximum and minimum values which Y between trace pointers will possibly take are updated and displayed.

In the state shown in FIG. 7 (E), trace pointers for the third and later points can be specified. For example, in a state where trace pointer (P3) for the third point is displayed in a position greater in the x-direction than the coordinate position of trace pointer P2, the maximum and minimum values between trace pointer P1 and trace pointer P2 and the maximum and minimum values between trace pointer P2 and trace pointer P3 are displayed as the results of calculation.

As described above, in the maximum/minimum value calculation mode, since the maximum and minimum values between two trace pointers are calculated and the results of calculation are displayed together with the graph, the range the graph will possibly take can be understood easily.

In step S204 of FIG. 4, if it has been determined that the set calculation mode is not the maximum/minimum value calculation mode, it is determined whether the set calculation mode is the integration calculation mode in which an integration value between points is found (step S206).

If it has been determined that the integration calculation mode has been set, an integration value between two adjacent trace pointers is calculated (step S207) and the result of calculation is displayed together with the graph on the display unit 19 (step S203), which completes the subroutine and returns control to the main routine of FIG. 2.

Figure 8:
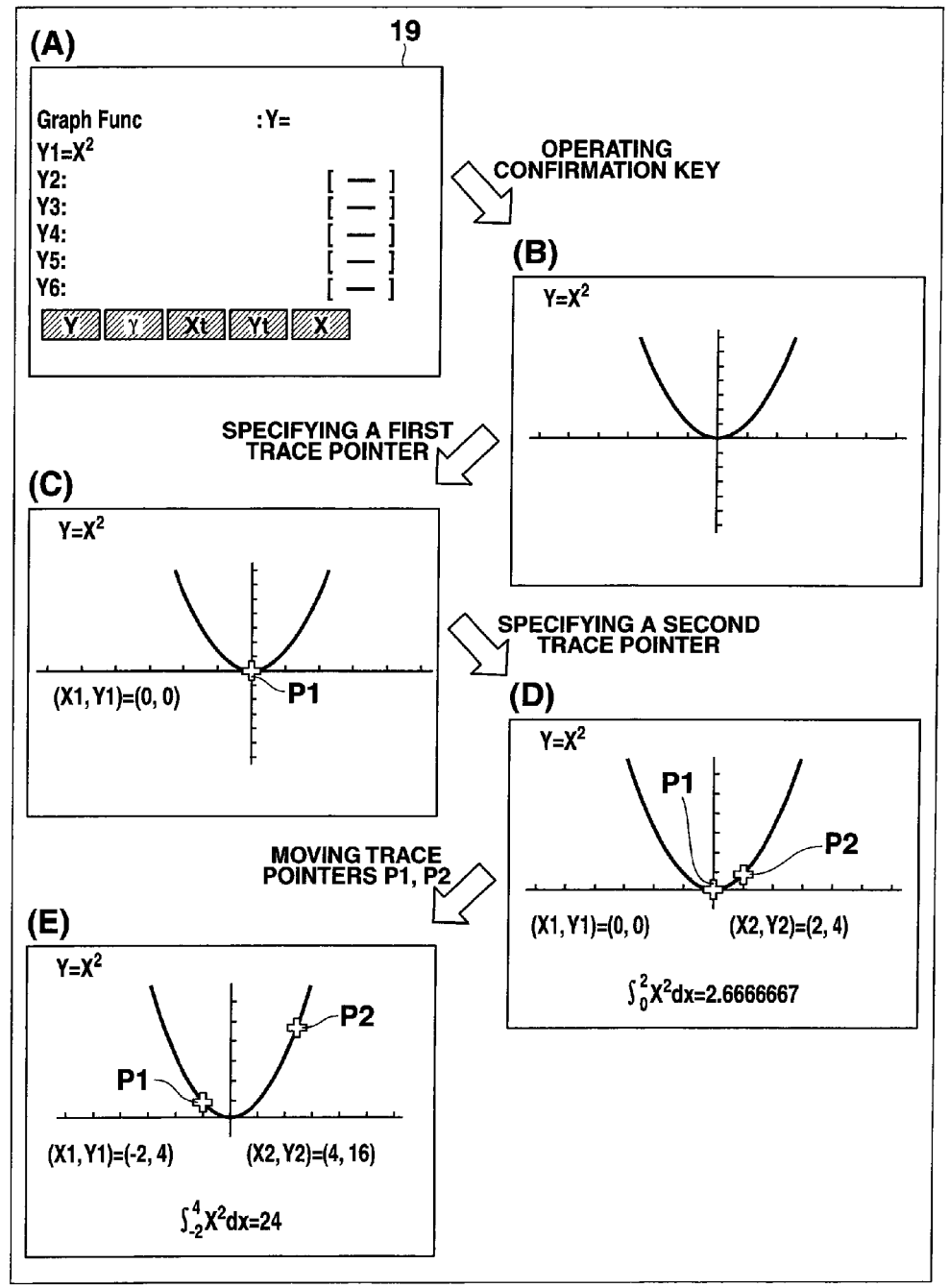
FIG. 8 illustrates a transition state of the display screen in an integration calculation mode according to the embodiment.

FIG. 8 shows an example of the transition of the screen on the display unit 19 when the integration calculation mode has been set. As shown in FIG. 8 (A), when the function expression "Y1=X2" is input and then the confirmation key 18*c* on the input unit 18 is operated, a graph corresponding to the function expression is displayed together with the function expression "Y=X2" on the display unit 19, as shown in FIG. 8 (B).

In the display state of FIG. 8 (B), when a trace pointer display operation is carried out, trace pointer P1 for the first point is displayed in the position of the origin, the intersection of the x- and y-axes, as shown in FIG. 8 (C). At this time, the coordinate values of trace pointer P1 are displayed as "(X1, Y1)=(0, 0)" together with the graph.

Here, when a trace pointer display operation is further carried out, trace pointer P2 for the second point is displayed in a position shifted a specific distance, for example, only 2, from trace pointer P1 in the positive direction of the x-axis, as shown in FIG. 8 (D). At this time, the coordinate values of trace pointer P2 are displayed as (X2, Y2)=(2, 4)" together with the graph.

With that, since the smallest plurality of trace pointers (or two trace pointers) have been specified, the integral equation calculated in step S207 is displayed together with the graph.

$\int_0^2 X^2 dx = 2.6666667$

A numeric value of "2.6666667" expressed by the integral equation shows the area of the part sandwiched by the graph between the relevant trace pointers and the x-axis represented by Y=0.

In the display state shown in FIG. 8 (D), with trace pointer P1 selected by, for example, the cursor keys 18*d*, the confirmation key 18*c* is operated to determine the selection of trace pointer P1 and then "←" key or "→" key in the cursor keys 18*d* is operated to move trace pointer P1 arbitrarily on the graph.

Similarly, with trace pointer SP2 selected by the cursor keys 18*d*, the confirmation key 18*c* is operated to determine the selection of trace pointer P2 and then "←" key or "→" key in the cursor keys 18d is operated to move trace pointer P2 arbitrarily on the graph.

FIG. 8 (E) shows a state where trace pointer P1 has been moved to the coordinate position (−2, 4) by operating, for example, "←" key in the cursor keys 18d and trace pointer P2 has been moved to the coordinate position (4, 16) by operating "→" key in the cursor keys 18d.

Here, not only are the coordinate positions displayed as "(X1, Y1)=(−2, 4)" "(X2, Y2)=(4, 16)" together with the graph, but also the integration equation is displayed.

$$\int_{-2}^{4} X^2 dx = 24$$

As described above, each time an arbitrary trace pointer P is selected and moved, the integration value between trace pointers is updated and displayed.

In the state shown in FIG. 8 (E), trace pointers for the third and later points can be specified. For example, in a state where trace pointer (P3) for the third point is displayed in a position greater in the x-direction than the coordinate position of trace pointer P2, the integration value between trace pointer P1 and trace pointer P2 and the integration value between trace pointer P2 and trace pointer P3 are displayed as the results of calculation.

As described above, in the integration calculation mode, since an integration value between two adjacent trace pointers is calculated and the result of calculation is displayed together with the graph, an accurate area or length of the range displayed on the graph can be understood easily.

In step S206 of FIG. 4, if it has been determined that the set calculation mode is not the integration calculation mode, it is determined that the set calculation mode is the maximum/minimum differential value calculation mode in which the maximum and minimum differential values between points is found (step S208).

If it has been determined that the maximum/minimum differential value calculation mode has been set, the maximum and minimum differential values between two adjacent trace pointers are calculated (step S209) and the results of calculation are displayed together with the graph on the display unit 19 (step S203), which completes the subroutine and returns control to the main routine of FIG. 2.

Figure 9:
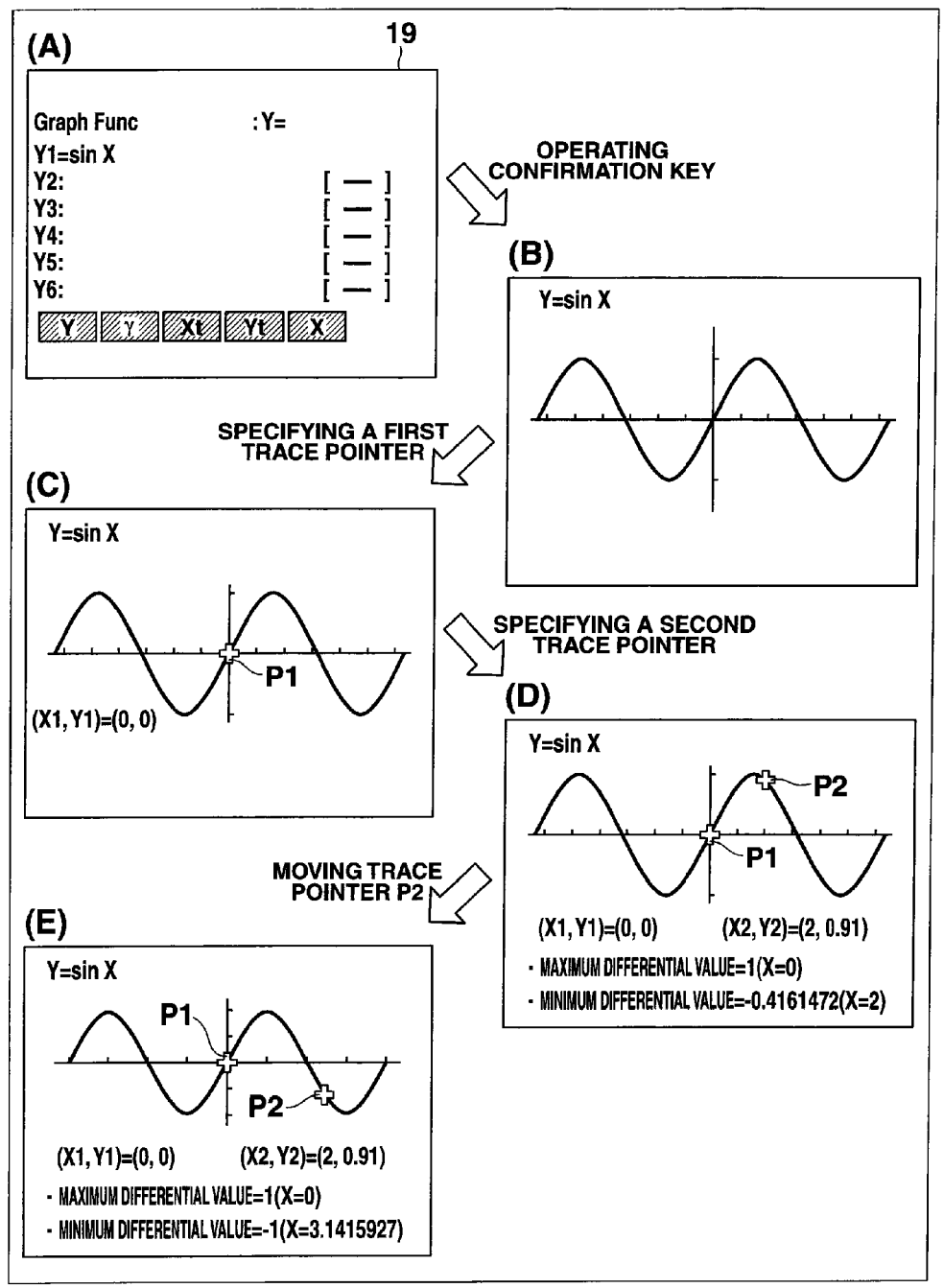
FIG. 9 illustrates a transition state of the display screen in a maximum/minimum differential value calculation mode according to the embodiment.

FIG. 9 shows an example of the transition of the screen on the display unit 19 when the maximum/minimum differential value calculation mode has been set. As shown in FIG. 9 (A), when the function expression "Y1=sin X" is input and then the confirmation key 18c on the input unit 18 is operated, a graph corresponding to the function expression is displayed together with the function expression "Y=sin X" on the display unit 19, as shown in FIG. 9 (B).

In the display state of FIG. 9 (B), when a trace pointer display operation is carried out, trace pointer P1 for the first point is displayed in the position of the origin, the intersection of the x- and y-axes. At this time, the coordinate values of trace pointer P1 are displayed as "(X1, Y1)=(0, 0)" together with the graph.

Here, when a trace pointer display operation is further carried out, trace pointer P2 for the second point is displayed in a position shifted a specific distance, for example, only 2, from trace pointer P1 in the positive direction of the x-axis. At this time, the coordinate values of trace pointer P2 are displayed as "(X2, Y2)=(2, 0.91)."

With that, since the smallest plurality of trace pointers (or two trace pointers) have been specified, the following are calculated in step S209 and displayed together with the graph:

Maximum differential value=1[X=0]

Minimum differential value=−0.4161472[X=2]

In the display state shown in FIG. 9 (D), with trace pointer P2 selected by, for example, the cursor keys 18d, the confirmation key 18c is operated to determine the selection of trace pointer P2 and then "←" key or "→" key in the cursor keys 18d is operated to move trace pointer P2 arbitrarily on the graph.

FIG. 9 (E) shows a state where trace pointer P2 is moved to the coordinate position (4, −0.77) by operating, for example, "→" key in the cursor keys 18d.

Here, the coordinate positions are displayed as "(X1, Y1)=(0, 0)" "(X2, Y2)=(4, 0.77)." At the same time, the following maximum and minimum differential values are calculated and displayed together with the graph:

Maximum differential value=1[X=0]

Minimum differential value=−1[X=3.1415927]

As described above, each time an arbitrary trace pointer P is selected and moved, the integration value between trace pointers is updated and displayed.

In the state shown in FIG. 9 (E), trace pointers for the third and later points can be specified. For example, in a state where trace pointer (P3) for the third point is displayed in a position greater in the x-direction than the coordinate position of trace pointer P2, the maximum and minimum differential values between trace pointer P1 and trace pointer P2 and the maximum and minimum differential values between trace pointer P2 and trace pointer P3 are displayed as the results of calculation.

As described above, in the maximum/minimum differential value calculation mode, since the maximum and minimum differential values between two trace pointers are calculated and the results of calculation are displayed together with the graph, the position with the largest slope and the position with the smallest slope can be known easily.

In step S208 of FIG. 4, if it has been determined that the set calculation mode is not the maximum/minimum differential value calculation mode, it is determined whether the set calculation mode is the continuity/discontinuity determination mode in which it is determined whether the graph is continuous or discontinuous between points is found (step S210).

If it has been determined that the continuity/discontinuity determination mode has been set, it is determined whether the graph between two adjacent trace pointers is continuous or discontinuous (step S211) and the determination result is displayed together with the graph on the display unit 19 (step S203), which completes the subroutine and returns control to the main routine of FIG. 2.

Figure 10:
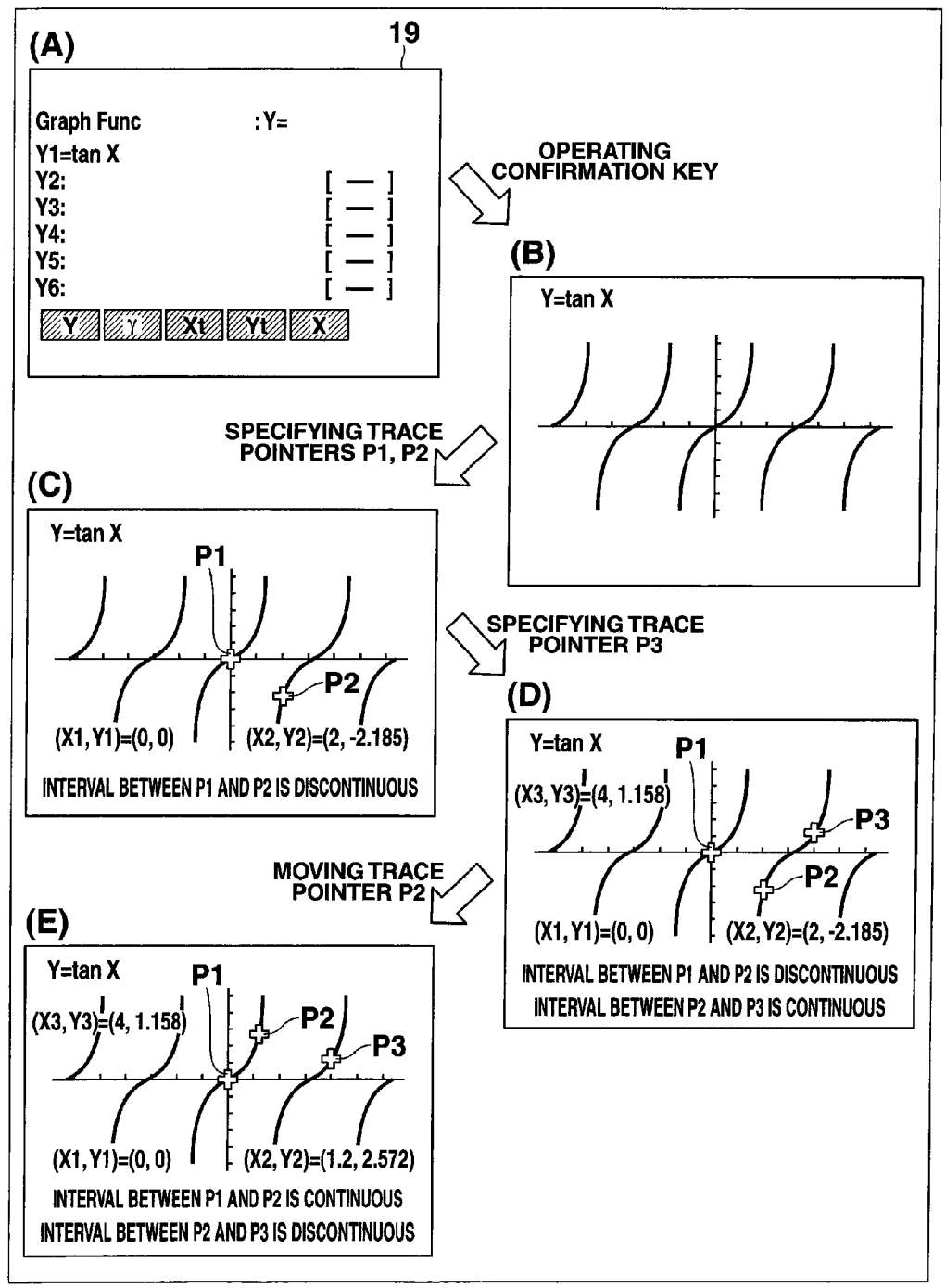
FIG. 10 illustrates a transition state of the display screen in a continuity/discontinuity determination mode according to the embodiment.

FIG. 10 shows an example of the transition of the screen on the display unit 19 when the continuity/discontinuity determination mode has been set. As shown in FIG. 10 (A), when the function expression "Y1=tan X" is input and then the confirmation key 18c on the input unit 18 is operated, a graph corresponding to the function expression is displayed together with the function expression "Y=tan X" on the display unit 19, as shown in FIG. 10 (B).

In the display state of FIG. 10 (B), when a trace pointer display operation is carried out, trace pointer P1 for the first point is displayed in the position of the origin, the intersection of the x- and y-axes. At this time, the coordinate values of trace pointer P1 are displayed as "(X1, Y1)=(0, 0)" together with the graph.

Here, when a trace pointer display operation is further carried out, trace pointer P2 for the second point is displayed in a position shifted a specific distance, for example, only 2, from trace pointer P1 in the positive direction of the x-axis. At this time, the coordinate values of trace pointer P2 are displayed as "(X2, Y2)=(2, −2.185)."

With that, since the smallest plurality of trace pointers (or two trace pointers) have been specified, the determination result in step S211 is displayed as "the interval between P1 and P2 is discontinuous" together with the graph.

In the display state shown in FIG. 10 (C), when a trace pointer display operation is further carried out, trace pointer P3 for the third point is displayed in a position shifted a specific distance, for example, only 2, from trace pointer P2 in the positive direction of the x-axis. At this time, the coordinate values of trace pointer P3 are displayed as "(X3, Y3)=(4, 1.158)."

Since the trace pointers for a total of three points have been specified, the following determination results in step S211 are displayed together with the graph:

"The interval between P1 and P2 is discontinuous and the interval between P2 and P3 is continuous"

In the display state shown in FIG. 10 (D), with trace pointer P2 selected by, for example, the cursor keys 18d, the confirmation key 18c is operated to determine the selection of trace pointer P2 and then "←" key or "→" key in the cursor keys 18d is operated to move trace pointer P2 arbitrarily on the graph.

FIG. 10 (E) shows a state where trace pointer P2 has been moved to the coordinate position (1.2, 2.572).

Here, the coordinate positions are displayed as "(X1, Y1)= (0, 0)" "(X2, Y2)=(1.2, 2.572)" "(X3, Y3)=(4, 1.158). At the same time, the following determination results are displayed together with the graph:

"The interval between P1 and P2 is continuous and the interval between P2 and P3 is discontinuous"

As described above, each time an arbitrary trace pointer P is selected and moved, the result of determining whether the interval between trace pointers is continuous or discontinuous is updated and displayed.

In the state shown in FIG. 10 (E), trace pointers for the fourth and later points can be specified. For example, in a state where trace pointer (P4) for the fourth point is displayed in a position greater in the x-direction than the coordinate position of trace pointer P3, the result of determining whether the interval between trace pointer P1 and trace pointer P2 is continuous or discontinuous, the result of determining whether the interval between trace pointer P2 and trace pointer P3 is continuous and discontinuous, and the result of determining whether the interval between trace pointer P3 and trace pointer P4 is continuous and discontinuous are displayed as the results of calculation.

As described above, in the continuity/discontinuity determination mode, since whether the graph is continuous or discontinuous between two trace pointers with an analysis point at midpoint between the pointers is determined and the determination result is displayed together with the graph, whether the graph is continuous or discontinuous between trace pointers near the analysis point can be easily understood.

In step S210 of FIG. 4, if it has been determined that the set calculation mode is not the continuity/discontinuity determination mode, it is determined whether the set calculation mode is the local maximum/minimum value calculation mode in which a local maximum value and a local minimum value between points are found (step S212).

If it has been determined that a calculation mode other than the local maximum/minimum value calculation mode has been set, an explanation of it will be omitted, provided that another suitable operation is performed.

If it has been determined in step S212 that the local maximum/minimum value calculation mode has been set, a local maximum value and a local minimum value between two adjacent trace pointers are calculated (step S213) and the results of calculation are displayed together with the graph on the display unit 19 (step S203), which completes the subroutine and returns control to the main routine of FIG. 2.

Figure 11:
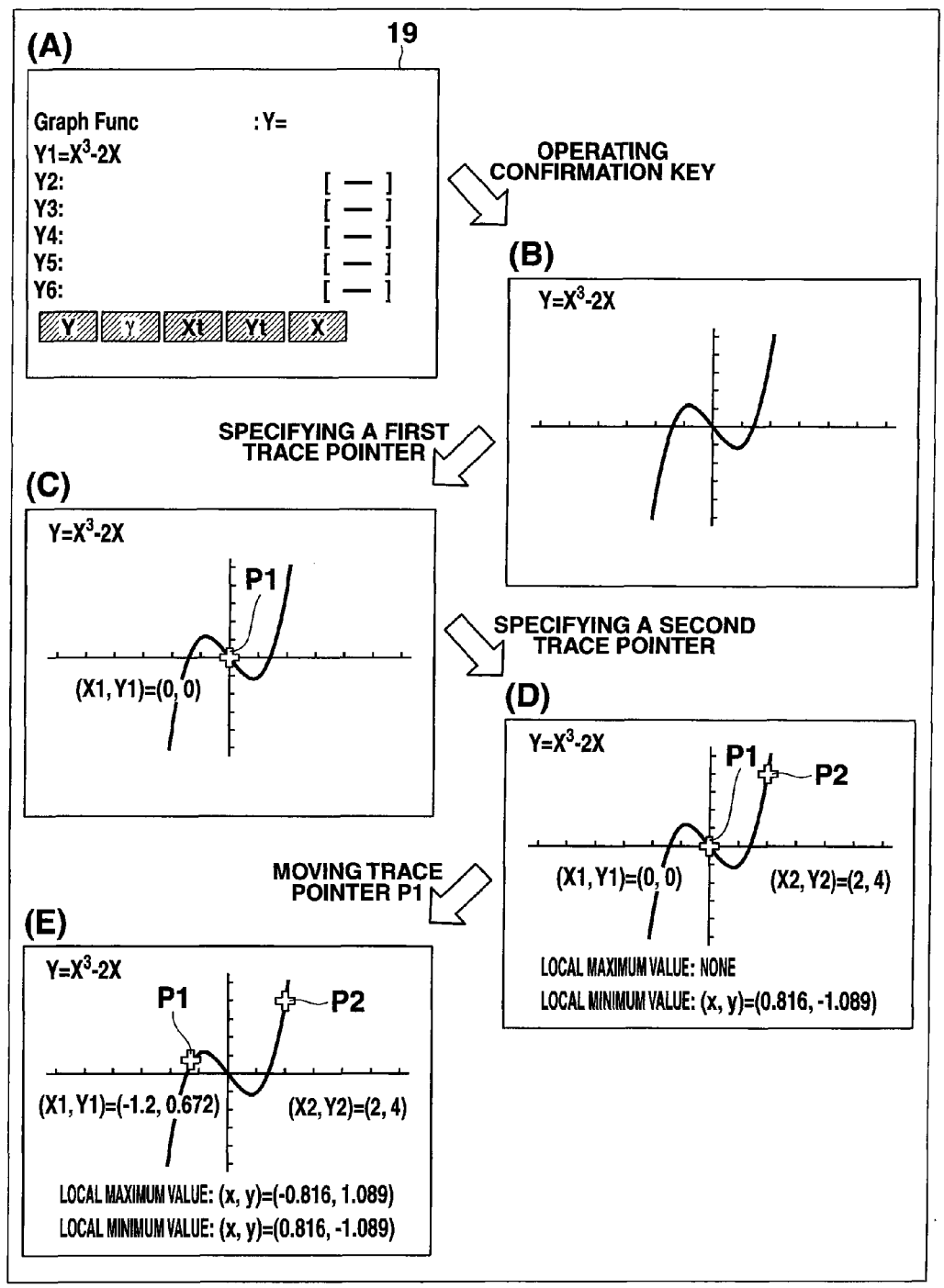
FIG. 11 illustrates a transition state of the display screen in a local maximum/minimum value calculation mode according to the embodiment.

FIG. 11 shows an example of the transition of the screen on the display unit 19 when the local maximum/minimum value calculation mode has been set. As shown in FIG. 11 (A), when the function expression "Y1=X3−2X" is input and then the confirmation key 18c on the input unit 18 is operated, a graph corresponding to the function expression is displayed together with the function expression "Y=X3−2X" on the display unit 19, as shown in FIG. 11 (B).

In the display state of FIG. 11 (B), when a trace pointer display operation is carried out, trace pointer P1 for the first point is displayed in the position of the origin, the intersection of the x- and y-axes. At this time, the coordinate values of trace pointer P1 are displayed as "(X1, Y1)=(0, 0)" together with the graph.

Here, when a trace pointer display operation is further carried out, trace pointer P2 for the second point is displayed in a position shifted a specific distance, for example, only 2, from trace pointer P1 in the positive direction of the x-axis, as shown in FIG. 11 (D). At this time, the coordinate values of trace pointer P2 are displayed as "(X2, Y2)=(2, 4)."

With that, since the smallest plurality of trace pointers (or two trace pointers) have been specified, the following are calculated in step S213 and displayed together with the graph:

| | |
|---|---|
| none | Local maximum value |
| (x,y)=(0.816,−1.089) | Local minimum value |

In the display state shown in FIG. 11 (D), for example, with trace pointer P1 for the first point selected by the cursor keys 18d, the confirmation key 18c is operated to determine the selection of trace pointer P1 and then "←" key or "→" key in the cursor keys 18d is operated to move trace pointer P1 arbitrarily on the graph.

Similarly, with trace pointer SP2 for the second point selected by the cursor keys 18d, the confirmation key 18c is operated to determine the selection of trace pointer P2 and then "←" key or "→" key in the cursor keys 18d is operated to move trace pointer P2 arbitrarily on the graph.

FIG. 11 (E) shows a state where trace pointer P1 for the first point has been moved to the coordinate position (−1, 0.672) by operating, for example, "←" key in the cursor keys 18d.

Here, the coordinate position is displayed as "(X1, Y1)=(−1, 0.672)." At the same time, the following local maximum and minimum values are calculated and displayed together with the graph:

| | |
|---|---|
| (x,y)=(−0.816,1.089) | Local maximum value |
| (x,y)=(0.816,−1.089) | Local minimum value |

As described above, each time an arbitrary trace pointer P is selected and moved, the local maximum and minimum values between trace pointers are updated and displayed.

In the state shown in FIG. 11 (E), trace pointers for the third and later points can be specified. For example, in a state where trace pointer (P3) for the third point is displayed, the local maximum and minimum values between trace pointer P1 and trace pointer P2 and the local maximum and minimum values between trace pointer P2 and trace pointer P3 are displayed as the results of calculation.

As described above, in the local maximum/minimum value calculation mode, it is determined whether there are a local maximum value and a local minimum value between two trace pointers. When there is at least one of a local maximum value and a local minimum value, its value is calculated and the result of calculation is displayed together with the graph. Therefore, when the graph takes at least one of a local maximum value and a local minimum value, its coordinate position can easily understood.

If it has been determined in step S110 of FIG. 2 that the distance between the trace pointers input at the time is set, the individual trace pointers are rearranged on the graph so that the distance may be equal to the distance in the x-axis direction previously set by the multipoint trace program 12c and, from this point on, setting is done so that the distance in the x-axis direction between the individual trace pointers may always be constant (step S111).

Figure 12:
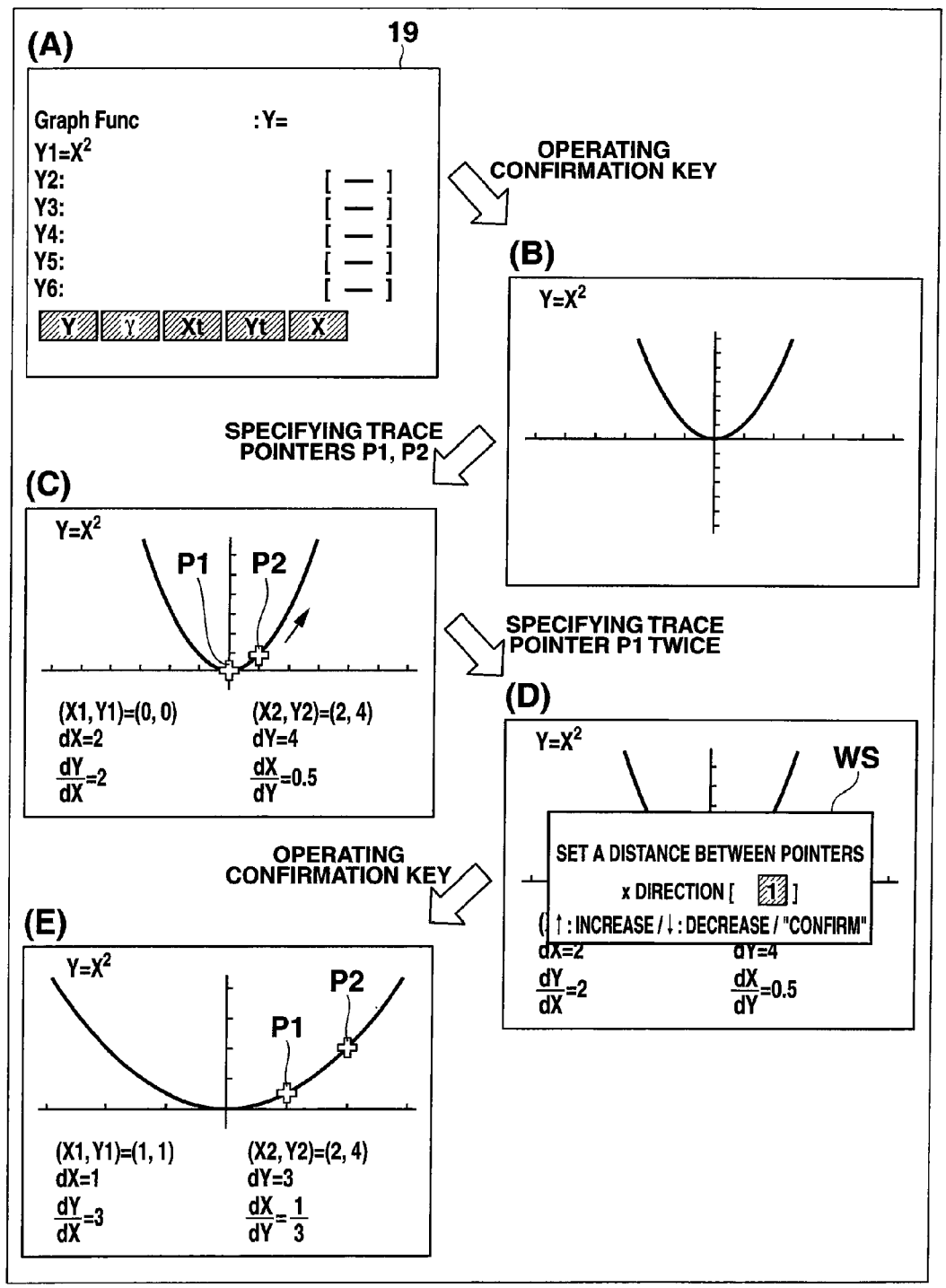
FIG. 12 illustrates a transition state of the display screen for the process of setting the distance-between-pointers in the slope calculation mode according to the embodiment.

FIG. 12 shows an example of the transition of the screen on the display unit 19 concerning the setting of trace pointer interval when the slope calculation mode has been set. As shown in FIG. 12 (A), when the function expression "Y1=X2" is input and then the confirmation key 18c on the input unit 18 is operated, a graph corresponding to the function expression is displayed together with the function expression "Y=X2" on the display unit 19, as shown in FIG. 12 (B).

In the display state of FIG. 12 (B), when the operation of displaying trace pointers for the first and second points is performed in sequence repeatedly, trace pointer P1 for the first point is displayed in the position of the origin, the intersection of the x- and y-axes, and trace pointer P2 for the second point is displayed in a position shifted a specific distance, for example, only 2, from trace pointer P1 in the positive direction of the x-axis, as shown in FIG. 12 (C).

At this time, the coordinate values of trace pointer P1 are displayed as "(X1, Y1)=(0, 0)" and the coordinate values of trace pointer P2 are displayed as "(X2, Y2)=(2, 4)."

With that, since the trace pointers for the two points have been specified, an increment of dX=2 in the x-direction, an increment of dY=4 in the y-direction, and slope of dY/dX=2, and a slope of dX/dY=0.5 are calculated and the results of calculation are displayed with the graph.

In the display state shown in FIG. 12 (C), for example, with trace pointer P1 for the first point selected by the cursor keys 18d, the confirmation key 18c is operated twice, which passes control to a state where the distance between trace pointers is set.

FIG. 12 (D) illustrates a trace pointer distance setting window WS displayed almost in the center of the display unit 19. In the window WS, the following is displayed:
Set a distance between pointers
X direction [1]
↑: increase/↓: decrease/"Confirm"
The default distance "1" is highlighted. On the basis of the distance at the time, the value is updated and set by operating "↑" key or "↓" key in the cursor keys 18d and the confirmation key 18c is operated to complete the setting.

With the distance between trace pointers being set to "1," when the setting has been completed, the graph display on the display unit 19 changes as shown in FIG. 12 (E) as a result of the setting.

In FIG. 12 (E), trace pointer P1 of the specified first point moves on the graph automatically so that the distance from trance pointer P2 for the second point may be equal to the set value "1." At this time, the coordinate values of trace pointer P1 are "(X1, Y1)=(1, 1), the coordinate values of trace pointer P2 are "(X2, Y2)=(2, 4), an increment in the x-direction is dX=2, an increment in the y-direction is dX=4, and slopes are "dY/dX=3" and "dX/dY=⅓" These equations are displayed together with the graph.

As described above, when an arbitrary trace pointer is selected and moved, the distance from another trace pointer is input and set, which makes it possible to know the slope or the like between two pointes a desired distance apart without a complicated moving operation of trace pointers.

In the state of FIG. 12 (E), it is possible to specify trace pointers for the third and later points or set the position of each of the trace pointers at a specific distance from an adjacent trace pointer.

This holds true for various cases excluding a case where the slope calculation mode has been set in FIG. 12. That is, it is possible to set the distance between trace pointers arbitrary in any one of the maximum/minimum value calculation mode, integration calculation mode, maximum/minimum differential value calculation mode, continuity/discontinuity determination mode, and local maximum/minimum value calculation mode.

If it has been determined in step S103 of FIG. 2 that an analysis point for analyzing the vicinity of a specific position on the graph has been set, the position of a point to be analyzed by the graphing program 12b and its coordinate value are displayed on the graph on the display unit 19 (step S115).

Then, trace pointers for two points, which are each equally spaced from the displayed analysis point in the positive and negative directions along the x-axis, for example, X∓0.5 from the analysis point, are displayed on the graph as a pair of pointers with the analysis point at midpoint between the pointers (step S16).

After the analysis point has been set, a second process is performed (step S117). In the second process, calculations between two points forming a pair are done by the inter-points analysis program 12d in the preset calculation mode and the results of calculation are displayed together with the graph.

The details of the distance-between-multipoint calculation result display process 2 will be described later.

In a state where the results of calculation are displayed, it is determined whether a key operation to specify the movement of one of the two trace pointers has been performed (step S118).

If it has been determined that a key operation to specify the movement has not been performed, it is determined whether an operation to terminate the operation of the graphical function calculator 10 and shut down the power supply has been performed (step S120).

If the power shutdown operation has not been performed, control returns to step S118. Then, the processes in steps S118 and S120 are carried out repeatedly, thereby waiting for either a key operation to specify the movement of the trace pointer or a key operation to terminate the operation and shut down the power supply to be performed.

Then, if a key operation to terminate the operation and shut down the power supply has been performed, it is determined in step S120 that the key operation has been performed and the power supply is shut down as requested by the operation, which completes the processes of FIGS. 2 and 3.

If it has been determined in step S118 that a key operation to specify the movement of the trace pointer has been performed, the specified trace pointer is moved on the graph by the multipoint trace program 12c according to the operation of the cursor keys ("←" and "→" keys) 18d on the input unit 18 and, at the same time, the other of the pair of trace pointers is also moved so that the distance from the analysis point in the x-direction may be the same, interlocking with the positional relationship between the moved trace pointer and the analysis point (step S119).

Thereafter, control proceeds to the process in step S117 and a second process is performed. In the second process, the inter-points analysis program 12d does calculations between two trace pointers on the basis of the trace pointer whose position has been moved on the graph and the results of calculation are displayed together with the graph.

Next, the second process in step S117 in each of the calculation modes will be explained in detail.

Figure 5:
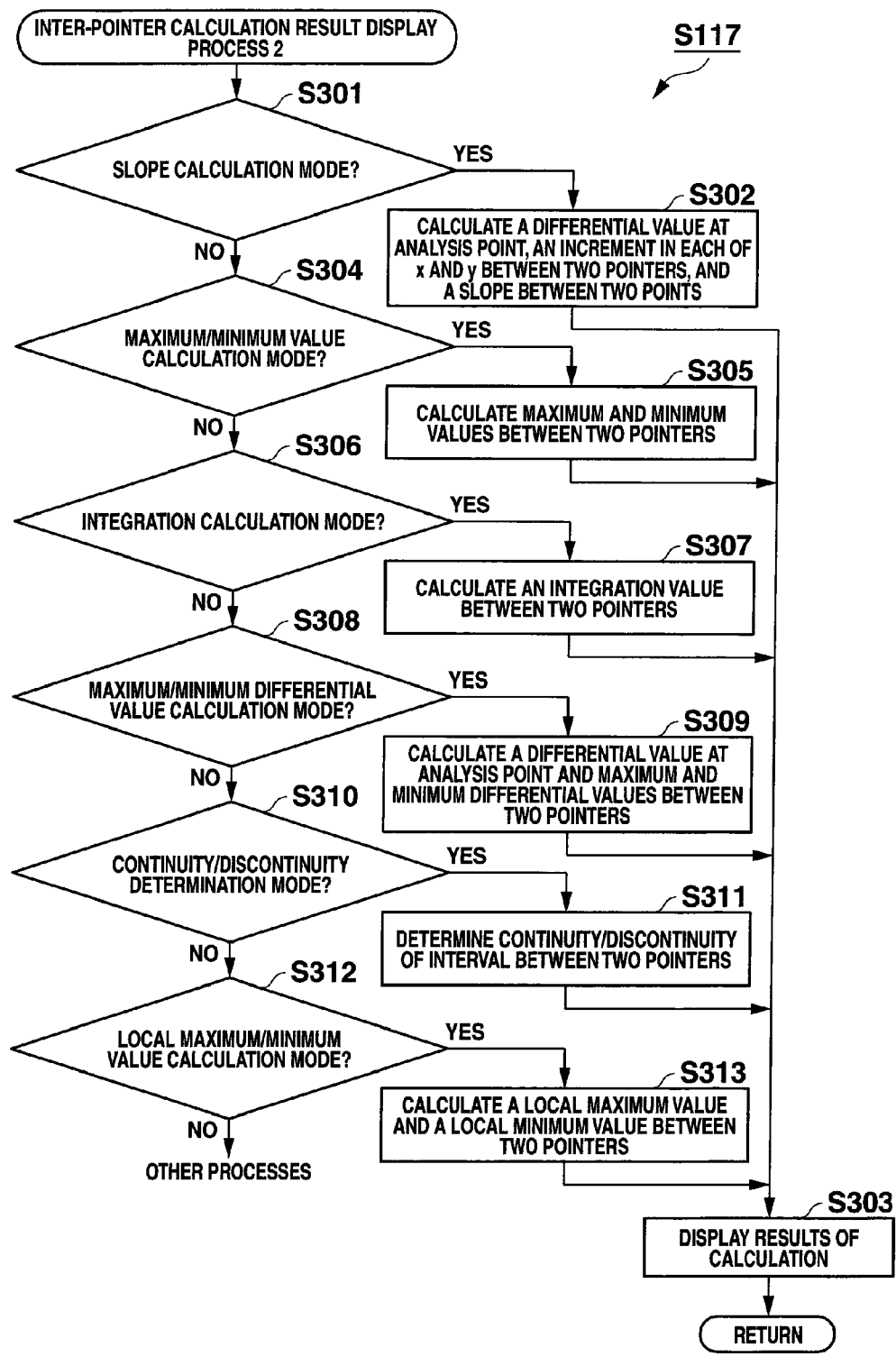
FIG. 5 is a flowchart to explain a subroutine of inter-pointer calculation result display process 2 of FIG. 3 according to the embodiment.

FIG. 5 shows a subroutine to explain the details of the second process related to the calculations between trace pointers and the display of the results of calculation in step S117.

At the beginning of the process, it is determined whether the calculation mode set at the time is the slope calculation mode in which a slope between points is calculated (step S301).

If it has been determined that the slope calculation mode has been set, a differential value at the analysis point, an increment in each of the x- and y-coordinates between two trace pointers, and a slope between the two points are calculated (step S302).

Then, the display unit 19 is caused to display the result of calculation together with the graph (step S303), which terminates the subroutine and returns control to the main routine of FIG. 3.

Figure 13:
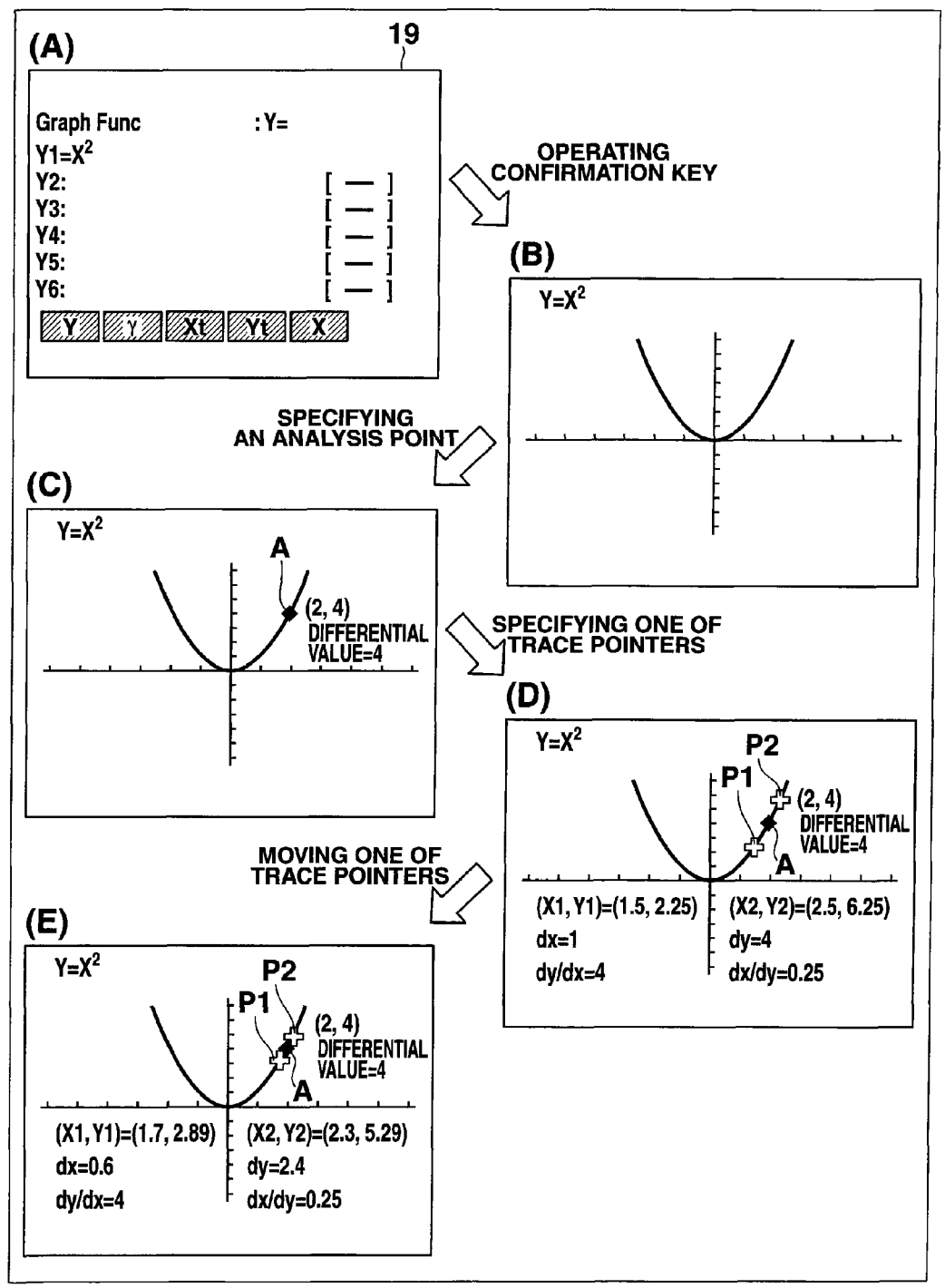
FIG. 13 illustrates a transition state of the display screen for the process of setting an analysis point in the slope calculation mode according to the embodiment.

FIG. 13 shows an example of the transition of the screen on the display unit 19 when the slope calculation mode has been set. As shown in FIG. 13 (A), when the function expression "Y1=X2" is input and then the confirmation key 18c on the input unit 18 is operated, a graph corresponding to the function expression is displayed together with the function expression "Y=X2" on the display unit 19, as shown in FIG. 13 (B).

In the display state of FIG. 13 (B), when an analysis point setting operation is carried out, the coordinates of the position of a point to be analyzed and a differential value at the position of the point are displayed, as shown in FIG. 13 (C).

In FIG. 13 (C), the coordinate position (2, 4) is the position of analysis point A and the differential value at that position is 4 (differential value=4).

Here, when a trace pointer display operation is further carried out, a pair of trace pointers P1, P2 whose x-coordinate values are ∓0.5 with respect to analysis point A is displayed on the graph, as shown in FIG. 13 (D). At this time, the coordinate values of trace pointers P1, P2 are displayed as "(X1, Y1)=(1.5, 2.25) "(X2, Y2)=(2.5, 6.25)" together with the graph.

With that, since a pair of trace pointers P1, P2 whose coordinate values are equally spaced from analysis point A at midpoint between the pointers have been specified, an increment of dX=1 in the x-direction, an increment of dY=4 in the y-direction, a slope of dY/dX=4, and a slope of dX/dY=0.25 are calculated and the results of calculation are displayed together with the graph.

Here, as for the slope between two trace pointers P1 and P2, a slope of dY/dX with respect to an increment in the x-direction and a slope of dX/dY with respect to an increment in the y-direction are determined. One of the two slopes is the reciprocal of the other unless both of them are not zero.

In the display state shown in FIG. 13 (D), with trace pointer SP1 selected by, for example, the cursor keys 18d, the confirmation key 18c is operated to determine the selection of trace pointer P1 and then "←" key or "→" key in the cursor keys 18d is operated to move trace pointer P1 arbitrarily on the graph.

FIG. 13 (E) shows a state where trace pointer P1 has been moved to the coordinate position (1.7, 2.89) by operating, for example, "→" key in the cursor keys 18d.

The position of trace pointer P2 moves automatically, interlocking with the movement of trace pointer P1. Since the distance between trace pointer P1 and the analysis point on the x-axis is 0.3, trace pointer P2 moves automatically to the coordinates (2.3, 5.29) to keep the equal distance in the x-axis direction.

After the movement of trace pointers P1, P2, an increment of dX=0.6 in the x-direction, an increment of dY=2.4 in the y-direction, a slope of dY/dX=4, and a slope of dY/dX=0.25 are calculated and the results of calculation are displayed together with the graph.

Each time one of the pair of trace pointers P1, P2 is selected and moved, the other of the pair of trace pointers P1, P2 moves, interlocking with the former. The increment in the x-coordinate, the increment in the y-coordinate, and the slope between trace pointers P1 and P2 making a pair are updated and displayed.

As described above, in the slope calculation mode, a differential value at analysis point A, an increment in each of the x- and y-coordinates between two trace pointers P1 and P2 with the analysis point at mid-point between them, and a slope between two points are calculated and the results of calculation are displayed together with the graph.

Accordingly, a slope liable to be visually misunderstood, depending on the setting of the display range, can be understood easily by displaying various numeric values together with the graph.

In addition, since the distance between two trace pointes with the analysis point at midpoint between them can be easily changed and set by the moving operation of trace pointers, the way the slope is changed by the setting of a range centering on the analysis point can be understood easily.

In step S301 of FIG. 5, if it has been determined that the set calculation mode is not the slope calculation mode, it is determined whether the set calculation mode is the maximum/minimum value calculation mode in which the maximum and minimum values between points is found (step S304).

If it has been determined that the maximum/minimum value calculation mode has been set, the maximum and minimum values between two adjacent trace pointers are calculated (step S305) and the results of calculation are displayed together with the graph on the display unit 19 (step S303), which completes the subroutine and returns control to the main routine of FIG. 3.

As described above, in the maximum/minimum value calculation mode, since the maximum and minimum values between two trace pointers are calculated and the results of calculation are displayed together with the graph, the range which the graph will possibly take can be understood easily.

In step S304 of FIG. 5, if it has been determined that the set calculation mode is not the maximum/minimum value calculation mode, it is determined whether the set calculation mode is the integration calculation mode in which an integration value between points is found (step S306).

If it has been determined that the integration calculation mode has been set, an integration value between two adjacent trace pointers is calculated (step S307) and the result of calculation is displayed together with the graph on the display unit 19 (step S303), which completes the subroutine and returns control to the main routine of FIG. 3.

As described above, in the integration calculation mode, since an integration value between two trace pointers is calculated and the result of calculation is displayed together with the graph, an accurate area or length of the range displayed on the graph can be understood easily.

In step S306 of FIG. 5, if it has been determined that the set calculation mode is not the integration calculation mode, it is determined whether the set calculation mode is the maximum/minimum differential value calculation mode in which the maximum and minimum differential values between points is found (step S308).

If it has been determined that the maximum/minimum differential value calculation mode has been set, not only a differential value at the analysis point but also the maximum and minimum differential values between two adjacent trace pointers are calculated (step S309) and the results of calculation are displayed together with the graph on the display unit 19 (step S303), which completes the subroutine and returns control to the main routine of FIG. 3.

As described above, in the maximum/minimum differential value calculation mode, since not only a differential value at the analysis point but also the maximum and minimum differential values between two trace pointers with the analysis point at midpoint between them are calculated and the results of calculation are displayed together with the graph, the position with the maximum slope and the position with the minimum slope in the range with the analysis point at midpoint on the graph can be easily known.

In step S308 of FIG. 5, if it has been determined that the set calculation mode is not the maximum/minimum differential value calculation mode, it is determined whether the set calculation mode is the continuity/discontinuity determination mode in which it is determined whether the graph is continuous or discontinuous between points is found (step S310).

If it has been determined that the continuity/discontinuity determination mode has been set, it is determined whether the graph is continuous or discontinuous between two adjacent trace pointers (step S311) and the determination result is displayed together with the graph on the display unit 19 (step S303), which completes the subroutine and returns control to the main routine of FIG. 3.

As described above, in the continuity/discontinuity determination mode, since it is determined whether the graph is continuous or discontinuous between two trace pointers with the analysis point at midpoint between them and the determination result is displayed together with the graph, whether the graph is continuous or discontinuous between trace pointers near the analysis point can be understood easily.

In step S310 of FIG. 5, if it has been determined that the set calculation mode is not the continuity/discontinuity determination mode, it is determined whether the set calculation mode is the local maximum/minimum value calculation mode in which a local maximum value and a local minimum value between two trace pointers are found (step S312).

If a calculation mode other than the local maximum/minimum value calculation mode has been set, an explanation of it will be omitted in the embodiment, provided that another suitable process is performed.

In step S312, if it has been determined that the local maximum/minimum value calculation mode has been set, a local maximum value and a local minimum value between two adjacent trace pointers are calculated (step S313) and the results of calculation are displayed together with the graph on the display unit 19 (step S303), which completes the subroutine and returns control to the main routine of FIG. 3.

As described above, in the local maximum/minimum value calculation mode, it is determined whether there are a local maximum value and a local minimum value between two trace pointers and, if at least one of a local maximum value and a local minimum value exists, the value of it is calculated and the result of calculation is displayed together with the graph. Therefore, when the graph takes at least one of a local maximum value and a local minimum value, its coordinate position can be known easily.

As the process in each of the calculation modes has been explained, the set calculation mode is performed in a state where the analysis point is displayed in the process of FIG. 5, thereby displaying the contents of the calculation together with the graph in each of the calculation modes, particularly including the position of an arbitrary point to be analyzed, which enables the user to gain a better understanding of the graph.

As described above, with the embodiment, it is possible to improve the capability of analyzing a function graph and deepen the level of understanding of a basic structure of a graph of a function expression by making various analyses of the relationship between two points on a graph.

While in the embodiment, the calculation mode is set in advance and a graph of the input function expression is displayed, the invention is not limited to this. For instance, after a graph of the input function expression is displayed and then trace pointers are displayed on the graph, each of the calculation modes may be selected and set. In that case, the selected calculation mode can be changed in a state where the graph of the function expression is displayed, which contributes to a better understanding of the graph of the function expression.

Furthermore, not only is the position of a trace pointer on the graph moved by moving the trace pointer displayed temporarily on the graph with the cursor keys 18*d*, but also the x-coordinate value may be input directly with the alphanumeric keys 18*b*. In that case, it is conceivable that, for example, infinity can be input.

The methods of operating in the mathematical operation modes on the graphical function calculator 10 described in the embodiment, including the process shown in the flowchart of FIG. 3, the subroutine of inter-pointer calculation result display process 1 shown in FIG. 4, and the subroutine of inter-pointer calculation result display process 2 shown in FIG. 5, can be stored in an external storage medium 13, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered.

The computer 11 of the graphical function calculator 10 reads the program stored in the external storage medium 13 into a storage unit 12 or work unit 17. The computer is controlled by the read-in program, thereby realizing the functions explained in the embodiment, which enables the same processes in the aforementioned methods to be carried out.

Furthermore, the data of the programs which realize the above methods can be transferred in the form of program code through a communication network (public line) N. The program data can be loaded into the computer 11 of the graphical function calculator 10 by the communication control unit 16 connected to the communication network N, thereby realizing the aforementioned functions.

Furthermore, the program data can be loaded into a personal computer, thereby realizing the aforementioned functions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic computer comprising:
a display unit;
a graph display control unit that performs display control of a graph corresponding to a function expression on the display unit;
a position specify unit that specifies a plurality of point positions on the graph displayed on the display unit according to a user operation;
a pointer display control unit that performs display control of a pointer for each of the plurality of point positions on the display unit specified by the position specify unit;
a calculation result display control unit that does a specific calculation on the basis of positional information on a plurality of pointers displayed on the display unit and the function expression of the graph and performs display control of a result of calculation on the display unit; and
a pointer movement control unit that performs movement display control on the graph of an arbitrary one of the plurality of pointers displayed on the display unit according to a user operation, wherein the calculation result display control unit performs the calculation again, updates the result of calculation, and performs display control of the updated result on the display unit each time the pointer movement control unit performs movement display control of a pointer; and
a distance setting unit that sets a distance between the pointers,
wherein the pointer movement control unit performs movement display control of the arbitrary pointer on the graph according to a user operation such that a distance from an adjacent pointer is kept at the distance set by the distance setting unit.

2. The electronic computer according to claim 1, wherein the calculation result display control unit calculates a slope between adjacent pointers based on coordinates of each of the plurality of pointers displayed on the display unit and performs display control of the result of calculation on the display unit.

3. The electronic computer according to claim 1, wherein the calculation result display control unit calculates at least one of the maximum value and minimum value in each of intervals on the graph sectionalized by the plurality of pointers displayed on the display unit and performs display control of the result of calculation on the display unit.

4. The electronic computer according to claim 1, wherein the calculation result display control unit calculates an integration value in each of intervals on the graph sectionalized by the plurality of pointers displayed on the display unit and performs display control of the result of calculation on the display unit.

5. The electronic computer according to claim 1, wherein the calculation result display control unit calculates at least one of the maximum differential value and minimum differential value in each of intervals on the graph sectionalized by the plurality of pointers displayed on the display unit and performs display control of the result of calculation on the display unit.

6. The electronic computer according to claim 1, wherein the calculation result display control unit calculates a determination on the continuity/discontinuity in each of intervals on the graph sectionalized by the plurality of pointers displayed on the display unit and performs display control of the result of calculation on the display unit.

7. The electronic computer according to claim 1, wherein the calculation result display control unit calculates at l east one of a local maximum value and a local minimum value in each of intervals on the graph sectionalized by the plurality of pointers displayed on the display unit and performs display control of the result of calculation on the display unit.

8. An electronic computer comprising:
a display unit;
a graph display control unit that performs display control of a graph corresponding to a function expression on the display unit;
a position specifying unit that specifies a plurality of point positions on the graph displayed on the display unit according to a user operation
a pointer display control unit that performs display control of a pointer for each of the plurality of point positions on the display unit specified by the position specifying unit;
a calculation result display control unit that performs a specific calculation based on positional information on a plurality of pointers displayed on the display unit and the function expression of the graph and performs display control of a result of calculation on the display unit; and
a pointer movement control unit that performs movement display control on the graph of an arbitrary one of the plurality of pointers displayed on the display unit according to a user operation;
wherein:
the calculation result display control unit performs the calculation again, updates the result of calculation, and performs display control of the updated result on the display unit each time the pointer movement control unit performs movement display control of a pointer,
the position specifying unit includes an analysis point specifying unit that specifies the position of a point to be analyzed on the graph displayed on the display unit as an analysis point and an analysis range specifying unit that specifies the positions of two points a specific distance apart in positive and negative directions on the graph with the analysis point at a midpoint between the points,
the pointer display control unit performs display control of a pointer in each of the positions of the two points specified by the analysis range specifying unit on the display unit, and
the calculation result display control unit performs a specific calculation based on positional information on the points of the two points displayed on the display unit and the function expression of the graph and performs display control of the result of calculation as an analysis result at the analysis point.

9. An electronic computer comprising:
a display unit;
an input unit; and
a processor that:
performs display control of a graph corresponding to a function expression on the display unit,
specifies a plurality of point positions on the graph displayed on the display unit according to an input from the input unit,
performs display control of a pointer for each of the plurality of point positions specified on the graph displayed on the display unit, performs a specific calculation based on positional information on a plurality of pointers displayed on the display unit and the function expression of the graph and performs display control of a result of calculation on the display unit, performs movement display control on the graph of an arbitrary one of the plurality of pointers displayed on the display unit according to an input from the input unit, performs the calculation again, updates the result of calculation, and performs display control of the updated result on the display unit each time a pointer is subjected to movement display control, sets a distance between the pointers according to an input from the input unit, and performs movement display control of the arbitrary pointer on the graph according to an input from the input unit such that a distance from an adjacent pointer is kept at the set distance.

10. The electronic computer according to claim 9, wherein the processor further calculates a slope between adjacent pointers based on the coordinates of each of the plurality of pointers displayed on the display unit and performs display control of the result of calculation on the display unit.

11. The electronic computer according to claim 9, wherein the processor further calculates at least one of the maximum value and minimum value in each of intervals on the graph sectionalized by the plurality of pointers displayed on the display unit and performs display control of the result of calculation on the display unit.

12. The electronic computer according to claim 9, wherein the processor further calculates an integration value in each of intervals on the graph sectionalized by the plurality of pointers displayed on the display unit and performs display control of the result of calculation on the display unit.

13. The electronic computer according to claim 9, wherein the processor further calculates at least one of the maximum differential value and minimum differential value in each of intervals on the graph sectionalized by the plurality of pointers displayed on the display unit and performs display control of the result of calculation on the display unit.

14. The electronic computer according to claim 9, wherein the processor further calculates a determination on the continuity/discontinuity in each of intervals on the graph sectionalized by the plurality of pointers displayed on the display unit and performs display control of the result of calculation on the display unit.

15. The electronic computer according to claim 9, wherein the processor further calculates at least one of a local maximum value and a local minimum value in each of intervals on the graph sectionalized by the plurality of pointers displayed on the display unit and performs display control of the result of calculation on the display unit.

16. An electronic computer comprises:
a display unit;
an input unit; and
a processor that:
performs display control of a graph corresponding to a function expression on the display unit,
specifies a plurality of point positions on the graph displayed on the display unit according to an input from the input unit,
performs display control of a pointer for each of the plurality of point positions specified on the graph displayed on the display unit,
performs a specific calculation based on positional information on a plurality of pointers displayed on the display unit and the function expression of the graph and performs display control of a result of calculation on the display unit, performs movement display control on the graph of an arbitrary one of the plurality of pointers displayed on the display unit according to an input from the input unit, performs the calculation again, updates the result of calculation, and performs display control of the updated result on the display unit each time a pointer is subjected to movement display control, specifies the position of a point to be analyzed on the graph displayed on the display unit as an analysis point, specifies the positions of two points a specific distance apart in positive and negative directions on the graph with the analysis point at a midpoint between the points, performs display control of a pointer in each of the positions of the specified two points on the display unit, performs a specific calculation based on positional information on the points of the two points displayed on the display unit and the function expression of the graph, and performs display control of the result of calculation as an analysis result at the analysis point.

17. A method of controlling a computer with a display unit, the method comprising:
performing display control of a graph corresponding to a function expression on the display unit;
specifying a plurality of point positions on the graph displayed on the display unit according to a user operation;
performing display control of a pointer for each of the plurality of point positions specified on the graph displayed on the display unit;
performing a specific calculation based on positional information on a plurality of pointers displayed on the display unit and the function expression of the graph and performing display control of a result of calculation on the display unit;
performing movement display control on the graph of an arbitrary one of the plurality of pointers displayed on the display unit according to a user operation; ri-d
performing the calculation again, updating the result of calculation, and performing display control of the updated result on the display unit each time a pointer is subjected to movement display control;
setting a distance between the pointers; and
performing movement display control of the arbitrary pointer on the graph according to a user operation such that a distance from an adjacent pointer is kept at the distance set by the distance setting unit, in performing the movement display control on the graph of the arbitrary one of the plurality of pointers displayed on the display unit according to the user operation.

18. A method of controlling a computer with a display unit, the method comprising:
performing display control of a graph corresponding to a function expression on the display unit;
specifying a plurality of point positions on the graph displayed on the display unit according to a user operation;
performing display control of a pointer for each of the plurality of point positions specified on the graph displayed on the display unit;
performing a specific calculation based on positional information on a plurality of pointers displayed on the display unit and the function expression of the graph and performing display control of a result of calculation on the display unit;

performing movement display control on the graph of an arbitrary one of the plurality of pointers displayed on the display unit according to a user operation;

performing the calculation again, updating the result of calculation, and performing display control of the updated result on the display unit each time a pointer is subjected to movement display control;

specifying the position of a point to be analyzed on the graph displayed on the display unit as an analysis point and specifying the positions of two points a specific distance apart in positive and negative directions on the graph with the analysis point at a midpoint between the points, in performing the movement display control on the graph of the arbitrary one of the plurality of pointers displayed on the display unit according to the user operation;

performing display control of a pointer in each of the specified positions of the two points on the display unit; and performing a specific calculation based on positional information on the points of the two points displayed on the display unit and the function expression of the graph and performing display control of the result of calculation as an analysis result at the analysis point, in performing the calculation again, updating the result of calculation, and performing the display control of the updated result on the display unit each time the pointer is subjected to the movement display control.

* * * * *

UNITED STATES PATENT AND TRADEMARK OFFICE
CERTIFICATE OF CORRECTION

PATENT NO. : 8,514,227 B2
APPLICATION NO. : 12/720097
DATED : August 20, 2013
INVENTOR(S) : Kouji Matsuda It is certified that error appears in the above-identified patent and that said Letters Patent is hereby corrected as shown below:

In the Claims

Column 19, Line 16, Claim 1, Line 6, delete "specify" and insert --specifying--.

Column 19, Line 21, Claim 1, Line 11, delete "specify" and insert --specifying--.

Column 19, Line 22, Claim 1, Line 12, delete "does" and insert --performs--.

Column 19, Line 23, Claim 1, Line 13, after "calculation" insert --based--.

Column 19, Line 23, Claim 1, Line 13, after "on" delete "the basis of".

Column 19, Line 26, Claim 1, Line 16, after "unit;" delete "and".

Column 20, Line 8, Claim 7, Line 2, delete "l east" insert --least--.

Column 20, Line 20, Claim 8, Line 8, after "operation" insert --;--.

Column 21, Line 22, Claim 10, Line 3, after "on" delete "the".

Column 22, Line 44, Claim 17, Line 17, after "operation;" delete "r-id".

Signed and Sealed this
First Day of April, 2014

Michelle K. Lee
*Deputy Director of the United States Patent and Trademark Office*